(12) United States Patent
Crum

(10) Patent No.: US 8,336,774 B2
(45) Date of Patent: Dec. 25, 2012

(54) SHOPPING APPARATUS AND METHODS

(75) Inventor: Bryan Eugene Crum, Louisville, KY (US)

(73) Assignee: Shopper's Club, LLC, Louisville, KY (US)

( * ) Notice: Subject to any disclaimer, the term of this patent is extended or adjusted under 35 U.S.C. 154(b) by 14 days.

(21) Appl. No.: 13/112,630

(22) Filed: May 20, 2011

(65) Prior Publication Data
US 2011/0215138 A1    Sep. 8, 2011

Related U.S. Application Data

(60) Provisional application No. 61/471,508, filed on Apr. 4, 2011.

(51) Int. Cl.
*G06K 15/00* (2006.01)
(52) U.S. Cl. .......................................... 235/383; 235/380
(58) Field of Classification Search .................... 235/383, 235/380, 381; 705/26.1
See application file for complete search history.

(56) References Cited

U.S. PATENT DOCUMENTS

| | | |
|---|---|---|
| 2,864,189 A | 12/1958 | Campbell |
| 2,888,761 A | 6/1959 | Miller |
| 3,082,557 A | 3/1963 | Huff |
| 3,251,543 A | 5/1966 | Bush et al. |
| 3,964,134 A | 6/1976 | Newtson |
| 3,982,659 A | 9/1976 | Ross |
| 4,292,749 A | 10/1981 | Thomas |
| 4,496,058 A | 1/1985 | Harris et al. |
| 4,535,912 A | 8/1985 | Bonk |
| 4,583,753 A | 4/1986 | Economy |
| 4,685,701 A | 8/1987 | Amundson et al. |
| 4,848,117 A | 7/1989 | Welborn et al. |
| 4,899,886 A | 2/1990 | Johansen |
| 4,901,901 A | 2/1990 | Reitenour |
| 4,978,006 A | 12/1990 | Juteau |
| 4,988,025 A | 1/1991 | Lipton et al. |
| 4,993,583 A | 2/1991 | Chasen |
| 5,002,215 A | 3/1991 | Gregoire |
| 5,004,252 A | 4/1991 | Kraper |
| 5,038,986 A | 8/1991 | Beauchesne |
| 5,048,736 A | 9/1991 | Anatra |
| 5,086,960 A | 2/1992 | Schwietzer |
| 5,114,009 A | 5/1992 | Johnston |

(Continued)

FOREIGN PATENT DOCUMENTS
AT    001523    6/1997
(Continued)

OTHER PUBLICATIONS

Zmuda, Natalie; Check-in Apps' Next Stop: Your Supermarket Aisles; Article; Nov. 15, 2010; pp. 1-2; AdAge.com; US.

*Primary Examiner* — Ahshik Kim
(74) *Attorney, Agent, or Firm* — Middleton Reutlinger; John F. Salazar; Scott W. Higdon

(57) ABSTRACT

Methods and apparatus related to enabling a shopper to utilize a mobile electronic device to check-in to a physical store while at the store. A shopper may utilize the mobile electronic device to read a check-in code at a location proximal to an entrance of a physical store. A substantially instantaneous pecuniary reward may be provided to the shopper upon reading of the check-in code and the shopper may be notified of such reward via the mobile electronic device.

21 Claims, 14 Drawing Sheets

U.S. PATENT DOCUMENTS

| | | | |
|---|---|---|---|
| 5,263,578 A | 11/1993 | Narvey | |
| 5,305,935 A | 4/1994 | Weiner | |
| 5,306,953 A | 4/1994 | Weiner | |
| 5,424,524 A | 6/1995 | Ruppert et al. | |
| 5,429,377 A | 7/1995 | Duer | |
| 5,489,120 A | 2/1996 | Thornsburg | |
| 5,566,609 A | 10/1996 | Kirschner | |
| 5,597,104 A | 1/1997 | Elliott | |
| 5,617,982 A | 4/1997 | Wilson | |
| 5,836,051 A | 11/1998 | Myers | |
| 5,848,723 A | 12/1998 | Krautsack | |
| D405,820 S | 2/1999 | Larson | |
| 5,981,211 A | 11/1999 | Hu et al. | |
| 6,000,610 A | 12/1999 | Talbott et al. | |
| 6,032,127 A * | 2/2000 | Schkolnick et al. | 705/23 |
| 6,158,640 A | 12/2000 | Karp et al. | |
| 6,177,880 B1 | 1/2001 | Begum | |
| 6,284,177 B1 | 9/2001 | Ewing | |
| 6,299,119 B1 | 10/2001 | Dunning | |
| 6,453,588 B1 | 9/2002 | Lykens | |
| 6,584,712 B2 | 7/2003 | Magid | |
| 6,644,501 B2 | 11/2003 | Iida | |
| 6,898,884 B1 | 5/2005 | Meyenberg | |
| 7,222,101 B2 | 5/2007 | Bishop et al. | |
| 7,584,149 B1 | 9/2009 | Bishop et al. | |
| 7,782,194 B2 * | 8/2010 | Stawar et al. | 340/539.13 |
| 7,873,543 B2 | 1/2011 | Perrier et al. | |
| 8,208,014 B2 * | 6/2012 | Geiger et al. | 348/61 |
| 2004/0069918 A1 | 4/2004 | McKinney | |
| 2005/0133595 A1 * | 6/2005 | Tanase | 235/383 |
| 2006/0011728 A1 | 1/2006 | Frantz et al. | |
| 2008/0052159 A1 | 2/2008 | Balakrishman et al. | |
| 2009/0234731 A1 | 9/2009 | Mariotti | |
| 2010/0078475 A1 | 4/2010 | Lin et al. | |
| 2010/0272193 A1 | 10/2010 | Khan et al. | |
| 2010/0274647 A1 | 10/2010 | Earle | |
| 2011/0047023 A1 | 2/2011 | Lieblang et al. | |
| 2011/0062237 A1 | 3/2011 | Chaves | |
| 2011/0071895 A1 | 3/2011 | Masri | |

FOREIGN PATENT DOCUMENTS

| | | |
|---|---|---|
| BR | 6602284 | 6/1988 |
| BR | MU85030880 | 1/1998 |
| BR | MU82019452 | 5/2004 |
| BR | D1166006899 | 5/2005 |
| BR | P1196079711 | 2/2006 |
| BR | P103036839 | 7/2007 |
| CA | 2459153 | 10/2004 |
| DE | 19955074 | 5/2001 |
| EP | 0895920 | 3/1998 |
| FR | 2713004 | 6/1995 |
| GB | 2176332 | 12/1986 |
| GB | 2386354 | 9/2003 |
| WO | 9200560 | 6/1997 |
| WO | 9721207 | 6/1997 |
| WO | 2006117627 | 11/2006 |

* cited by examiner

SHOPPING APPARATUS AND METHODS

CROSS-REFERENCE TO RELATED DOCUMENTS

This Application claims priority to Provisional Application Ser. No. 61/471,508 filed on Apr. 4, 2011 and entitled "Shopping Apparatus and Methods," which is hereby incorporated by reference.

TECHNICAL FIELD

The present invention is directed generally to aspects of apparatus and methods related to shopping. More particularly, various inventive methods and apparatus disclosed herein relate to enabling a shopper to utilize a mobile electronic device to check-in to a physical store while at the store.

BACKGROUND

Many stores utilize one or more strategies to entice consumers to patronize their store and/or to gather purchasing data from consumers. For example, many retail stores have a rewards card that may be scanned during the check-out procedure to thereby entitle the shopper to a discount on the current purchase and/or to an allotment of points that may be used for future purchases and/or rewards. Such rewards cards may entice the shopper to shop at a store to obtain discounts and/or points and may also enable a store to gather data concerning that shopper.

Also, for example, many retail stores may utilize advertisements and/or coupons, optionally in combination with the rewards card, to entice consumers to patronize their store. For example, circular ads may tout specials that may be obtained through utilization of the rewards card. Also, for example, coupons may be scanned during the check-out procedure to thereby entitle the shopper to a discount on one or more items they purchase.

Although such strategies may provide enticement for customers to patronize a store and/or may enable for the gathering of purchasing data from consumers, they may have one or more drawbacks and/or may be improved in one or more ways. For example, rewards cards, circular ads, and coupons do not provide a pecuniary benefit to a shopper until during the checkout process. Also, for example, shoppers may not have sufficient motivation to view a circular ad and/or coupon. Also, for example, circular ads and/or coupons may not be tailored to a particular shopper and/or a particular store.

Thus, applicant has recognized and appreciated a need to provide methods and/or apparatus that enable a shopper to utilize a mobile electronic device to check-in to a physical store, while optionally overcoming one or more drawbacks of and/or improving upon previous methods and apparatus.

SUMMARY

The present disclosure is generally directed to various aspects of apparatus and methods related to shopping. For example, some aspects are directed toward methods and apparatus related to enabling a shopper to utilize a mobile electronic device to check-in to a physical store while at the store. For example, in some embodiments a shopper may utilize a mobile electronic device to scan a check-in code at a location proximal to an entrance of a physical store. For example, the check-in code may be attached to a shopping cart and scanned by the mobile electronic device shortly after entering the store. A substantially instantaneous pecuniary reward may be provided to the shopper upon reading of the check-in code and the shopper may be substantially instantly notified of such reward via the mobile electronic device.

Generally, in one aspect, a method of providing retail information on a shopping cart with combinational electronic retail specific information for a consumer is provided. The method includes the steps of: attaching an informational display to a shopping cart of the physical store; removably securing at least one retail informational sheet in the informational display, the at least one retail informational sheet including a check-in code having store identification data; scanning the check-in code utilizing a mobile electronic device when at the physical store; electronically identifying the physical store based on the store identification data contained within the check-in code; identifying a shopper based on shopper identification data transmitted by the mobile electronic device; providing a link to a pecuniary check-in rewards account of the shopper on the mobile electronic device; providing a substantially instantaneous pecuniary check-in reward to the pecuniary check-in rewards account of the shopper upon utilizing the mobile electronic device to read the check-in code; and substantially instantaneously notifying the shopper of the pecuniary check-in reward via the mobile electronic device.

In some embodiments the informational display is removably attached to a handle of the shopping cart.

In some embodiments the method further includes directing the mobile electronic device to at least one physical store screen after scanning the check-in code utilizing the mobile electronic device. In some versions of those embodiments the physical store screen contains at least some store information pertinent to at least the physical store. In some versions of those embodiments the physical store screen contains at least some store specific information pertinent only to the physical store.

In some embodiments the method further includes providing a substantially instantaneous further pecuniary reward to the shopper after scanning the check-in code utilizing the mobile electronic device and after at least one further recordable action within the physical store. In some versions of those embodiments the at least one further recordable action within the physical store includes viewing additional information related to an in-store product on the mobile electronic device.

Generally, in another aspect a method of electronically checking-in to a retail store includes the steps of: securing at least one removable display to a shopping cart of a retail store, the at least one removable display including a check-in code having store identification data; scanning the check-in code utilizing a mobile electronic device to read the check-in code when at a location proximal to an entrance of the retail store; identifying the retail store based on store identification data contained within the check-in code; identifying a shopper based on shopper identification data transmitted by the mobile electronic device; providing a substantially instantaneous pecuniary check-in reward to the shopper upon utilizing the mobile electronic device to read the check-in code; notifying the shopper of the pecuniary check-in reward via the mobile electronic device; and providing a substantially instantaneous further pecuniary reward to the shopper after utilizing the mobile electronic device to read the check-in code and after at least one further recordable action within the retail store.

In some embodiments the method further includes directing the mobile electronic device to at least one physical store screen after scanning the check-in code utilizing the mobile electronic device. In some versions of those embodiments the physical store screen contains at least some store information pertinent to at least the physical store. In some versions of those embodiments the physical store screen contains at least some store specific information pertinent only to the physical store.

In some embodiments the method further includes providing a substantially instantaneous shopper's account check-in reward to a shopper rewards account of the shopper upon utilizing the mobile electronic device to scan the check-in code.

In some embodiments the method further includes enabling the shopper to share the pecuniary check-in reward with third parties via the mobile electronic device. In some versions of those embodiments the method further includes enabling the shopper to share a selected percentage of the pecuniary reward with each of a plurality of third parties via the mobile electronic device.

In some embodiments the method further includes utilizing geolocation to verify the store identification data.

In some embodiments the method further includes utilizing geolocation to further refine the store identification data.

Generally, in another aspect a method of providing replaceable retail specific information on a shopping cart including electronic information, includes the steps of: affixing an informational display on a visible location of a shopping cart; incorporating a housing on the informational shopping cart display; removably retaining a magazine insert in the housing on the informational shopping cart display, the magazine including retail specific printed information for a particular retail location; incorporating on the retail specific printed information at least one scanning code in a visible location on the informational display; scanning the at least one scanning code on the magazine insert which is removably retained on the housing of the informational shopping cart display utilizing a mobile electronic device particularized to a specific shopper; electronically identifying the particularized shopper and the particular retail location based upon the scanned at least one scanning code on the magazine insert; linking to a shopper check-in rewards account for the particularized shopper by the mobile electronic device; providing to the mobile electronic device retail specific electronic information for the particular retail location; crediting the check-in rewards account for the particularized shopper based upon the particular retail location; notifying the particularized shopper of the credited check-in rewards account substantially instantaneously.

In some embodiments the method further includes providing a substantially instantaneous shopper's account check-in reward to a shopper rewards account of the shopper upon utilizing the mobile electronic device to scan the scanning code.

In some embodiments the method further includes providing a substantially instantaneous further pecuniary reward to the shopper after utilizing the mobile electronic device to scan the scanning code and after at least one further recordable action within the retail store and prior to engaging in a check-out process within the store.

Generally, in other aspects, other apparatus, systems, and/or methods related to shopping are provided. Such apparatus, systems, and/or methods may utilize a mobile electronic device to enhance a shopping experience for a shopper and/or for a store.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The present disclosure is described with narrative and reference to flowcharts and/or diagrams that illustrate methods, apparatus or systems, and computer program product. Each portion of the narrative, block of the various flowcharts, and combinations of blocks in the flowcharts, can be implemented by computer program instructions. Such computer program instructions can be loaded onto a general-purpose computer, special-purpose computer, or other programmable data processing device to produce a machine, such that the instructions that execute on the computer or other programmable data processing apparatus create means for implementing the functions specified in the flowcharts or elsewhere in this specification. The computer program instructions can also be stored in a computer-readable memory that directs a computer or other programmable data processing device to function in a particular manner, such that the instructions stored in the computer-readable memory produce an article of manufacture including instruction means which implement the function specified in the flowcharts or diagrams. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowcharts or diagrams.

It will be understood that blocks of the flowcharts and other aspects of this specification support combinations of systems for performing the specified functions, combinations of steps for performing the specified functions, and program instructions for performing the specified functions. Each block of the flowcharts or diagrams, combinations of blocks in the flowcharts or diagrams, and other aspects of the specification can be implemented by special-purpose, hardware-based computer systems which perform the specified functions or steps, or combinations of special-purpose hardware and computer instructions.

Aspects of the present disclosure can be implemented using any computer programming language, now known or developed in the future. Likewise, various computers and/or processors may be used to carry out aspects of the present disclosure without being limited to those described herein.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, check-in barcodes may be depicted herein as Quick Response (QR) barcodes. However, one or more check-in barcodes having other configurations may be implemented in certain embodiments of the methods and apparatus described herein and implementation of the other configurations in alternatively configured methods and apparatus is contemplated without deviating from the scope or spirit of the claimed invention. For example, one or more Semacode barcodes, High Capacity Color Barcodes, Shot-Code barcodes, Aztec barcodes, matrix barcodes, and/or other barcodes having an optical machine-readable representation of data may be utilized.

Figure 1:
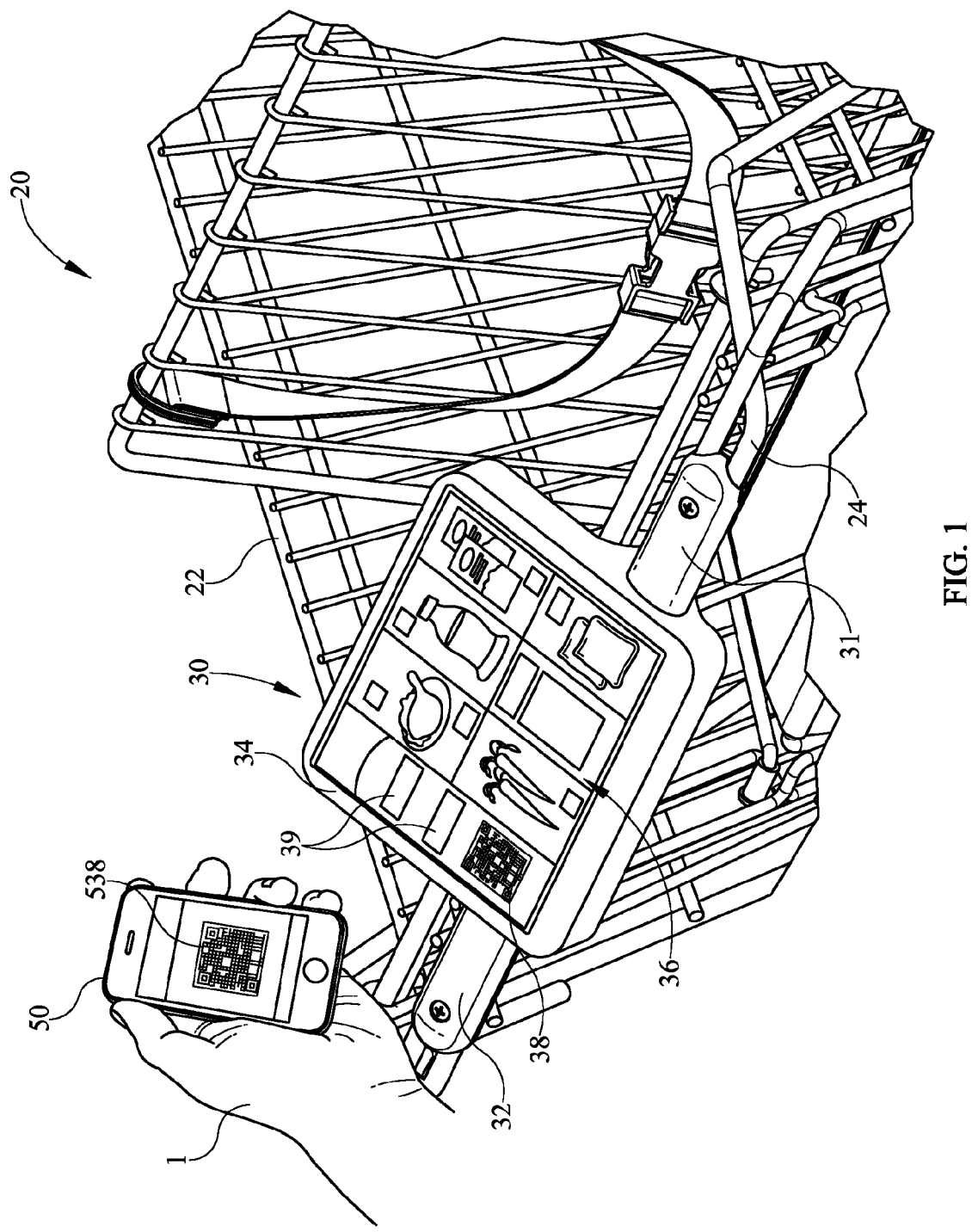
FIG. 1 illustrates a shopping cart having a display with a check-in barcode; a mobile electronic device of a shopper is positioned adjacent the check-in barcode.

Referring to FIG. 1, a shopping cart 20 is illustrated. The shopping cart 20 includes a basket 22 and a handle 24 extending rearwardly from the basket 22 for driving and steering the shopping cart 20. An informational display 30 is attached to the handle 24 via engagement of handles 31 and 32 of the informational display 30 with the handle 24 of the shopping cart 20. The informational display 30 may be fixedly or removably attached to the handle 24. In alternative embodiments the informational display 30 may optionally be integrally formed with the handle 24. The informational display 30 includes a housing 34 that removably retains a magazine insert 36 having a QR type check-in barcode 38 on an outward facing side of an outermost page thereof. Instructions 39 are provided adjacent the check-in barcode 38 that provide graphic and/or written instructions to a shopper. The instructions generally inform the shopper to scan the check-in barcode 38 utilizing a mobile electronic device.

The magazine insert 36 includes a plurality of individual pages that are bound to one another. Some of the individual pages may optionally be provided with information on both sides thereof. The magazine insert 36 may include additional shopping related information and/or advertisement information. For example, the magazine insert 36 may include store specials, a store map, a store item index, one or more recipes, one or more shopping checklists, one or more project tutorials, one or more advertisements for items in the store, one or more advertisements for nearby businesses, and/or other shopping related information and/or advertisement information. In alternative embodiments the magazine insert 36 may only include a single sheet, optionally with information on only one side thereof. The magazine insert 36 may be periodically replaced to, inter alia, change information thereon, for aesthetic purposes, and/or to change the check-in barcode 38. The magazine insert 36 may be removably retained on the housing 34 utilizing, for example, one or more of an adhesive, clips, a retaining lip sized to fit around all or portions of the periphery of the magazine insert 36, screws, zip ties, and/or other retention apparatus and/or methods.

Although a check-in barcode 38 is depicted herein as being on a particular magazine insert 36 removably received in a housing 34 attached to a handle 24, one of ordinary skill in the art, having had the benefit of the present disclosure, will recognize and appreciate that in alternative embodiments the check-in barcode 38 may be otherwise coupled to or integrally formed with the shopping cart 20. For example, the check-in barcode 38 may be on a sheet insert removably attachable to a housing on the basket 22, may be encased behind a clear outer casing of the handle 24, may be molded into a plastic basket 22 and/or handle 24, and/or may be attached via a clip removably attached to the shopping cart 20.

Moreover, as described in detail herein, one of ordinary skill in the art, having had the benefit of the present disclosure, will recognize and appreciate that in some alternative embodiments the check-in barcode 38 may be provided coupled to alternative items that may be proximal to the entrance of a store. For example, in some embodiments the check-in barcode 38 may be provided on posters positioned proximal to the entrance of a store, may be provided on an entrance door of a store, may be provided on standalone displays provided proximal to the entrance of a store, may be provided on small shopping baskets provided proximal to the entrance of a store, and/or may be provided on a circular ad and/or circular ad stand provided proximal to the entrance of a store. Providing the check-in barcode 38 proximal to the entrance of a store may provide a shopper with the opportunity to utilize the check-in barcode 38 within the first minutes of entering the store.

A hand 1 of a shopper is also depicted in FIG. 1 holding a cell phone 50 adjacent to the check-in barcode 38. The shopper has just utilized the cell phone 50 to scan the check-in barcode 38 and an image 538 of the check-in barcode 38 is still visible on the screen of the cell phone 50. In some embodiments the cell phone 50 may scan the check-in barcode 38 by utilizing a camera of the cell phone to temporarily capture one or more images of the check-in barcode 38 and analyzing the check-in barcode 38 within the image(s). In other embodiments the mobile phone 50 may capture one or more images of the check-in barcode 38 and send the image(s) to a server for analysis. As described in detail herein, once the shopper has scanned the check-in barcode 38, the shopper will be checked-in to the store and a substantially instantaneous pecuniary reward may be provided to the shopper. Moreover, additional information regarding the store, items in the store, projects related to items in the store, etc. may optionally be provided to the shopper after scanning the check-in barcode 38. Such additional information may optionally be tailored to the shopper.

Figure 2:
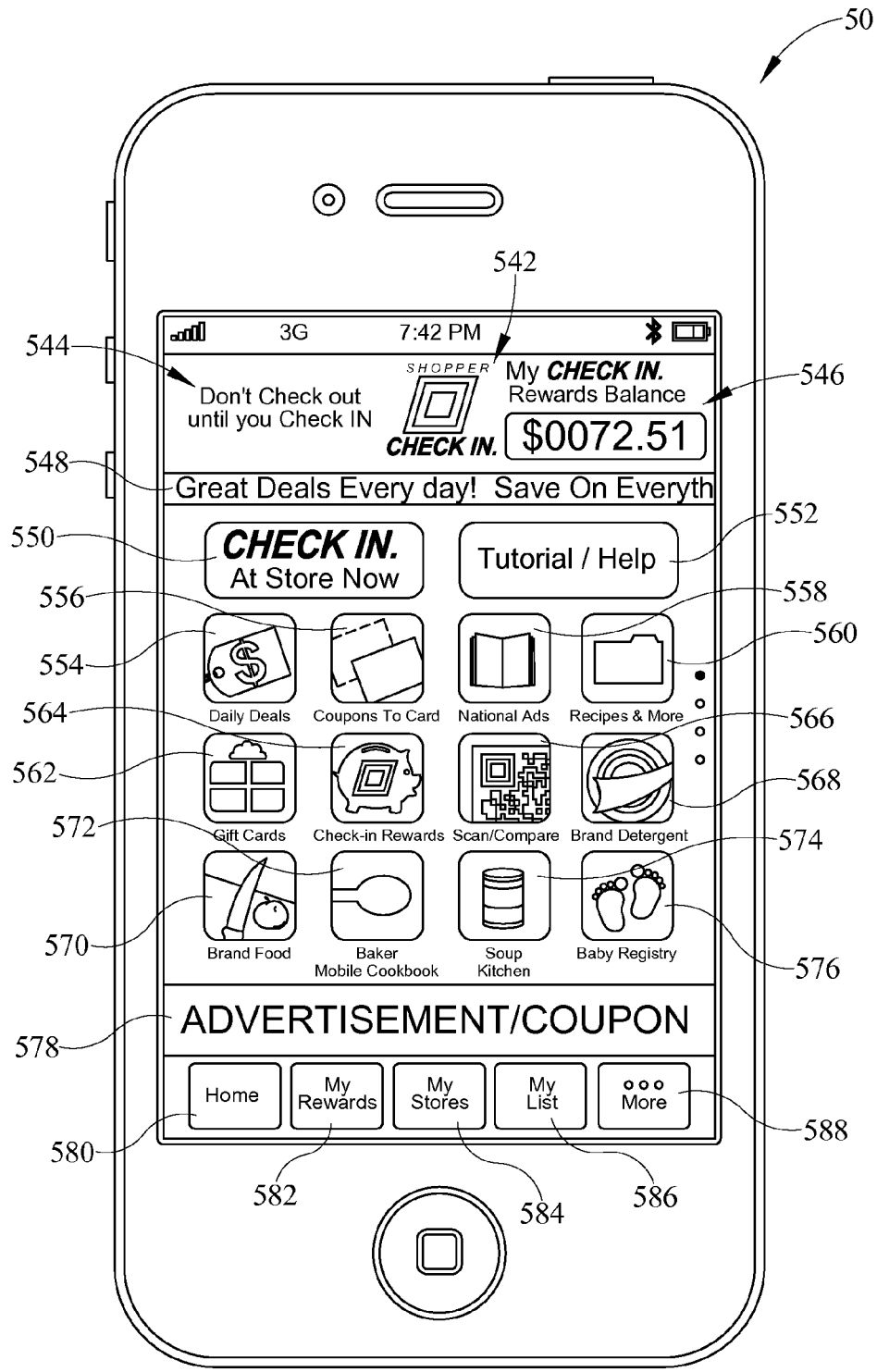
FIG. 2 illustrates the mobile electronic device displaying a home screen of an embodiment of an application for checking-in to a physical store.

Referring now to FIGS. 2-6, the mobile electronic device 50 is illustrated displaying various screens of an embodiment of an application for checking-in to a physical store. FIG. 2 illustrates a home screen of the embodiment of an application for checking-in to a physical store. The home screen includes an application logo 542 ("CHECK-IN") and application slogan 544 ("Don't check out until you Check-in"). The home screen also includes a check-in rewards bar 546 that displays the shopper's current balance of check-in rewards. The balance of check-in rewards is in cash in various embodiments depicted herein. However, as described in detail herein, other pecuniary check-in rewards may be utilized such as, for example, points that may be redeemed for pecuniary savings, coupons that may be redeemed for pecuniary savings, and/or gift certificates that may be redeemed for pecuniary savings. The pecuniary check-in rewards may be provided in such alternative formats initially or after conversion from a cash or other format by a shopper.

Located below the application logo 542 and the application slogan 544 is a ticker area 548 that may display textual information as desired. For example, the ticker area 548 may display scrolling text that highlights new features of the application, may display scrolling text that highlights merchants that interface with the application, and/or may display scrolling text highlighting features of the application. The ticker area 548 may optionally be clickable by a user to display additional information. For example, clicking the ticker area 548 may direct the mobile phone 50 to a web page containing additional information pertinent to the textual information displayed in the ticker area 548. In some embodiments the ticker area 548 may display an advertisement or other paid-for material.

Figure 3:
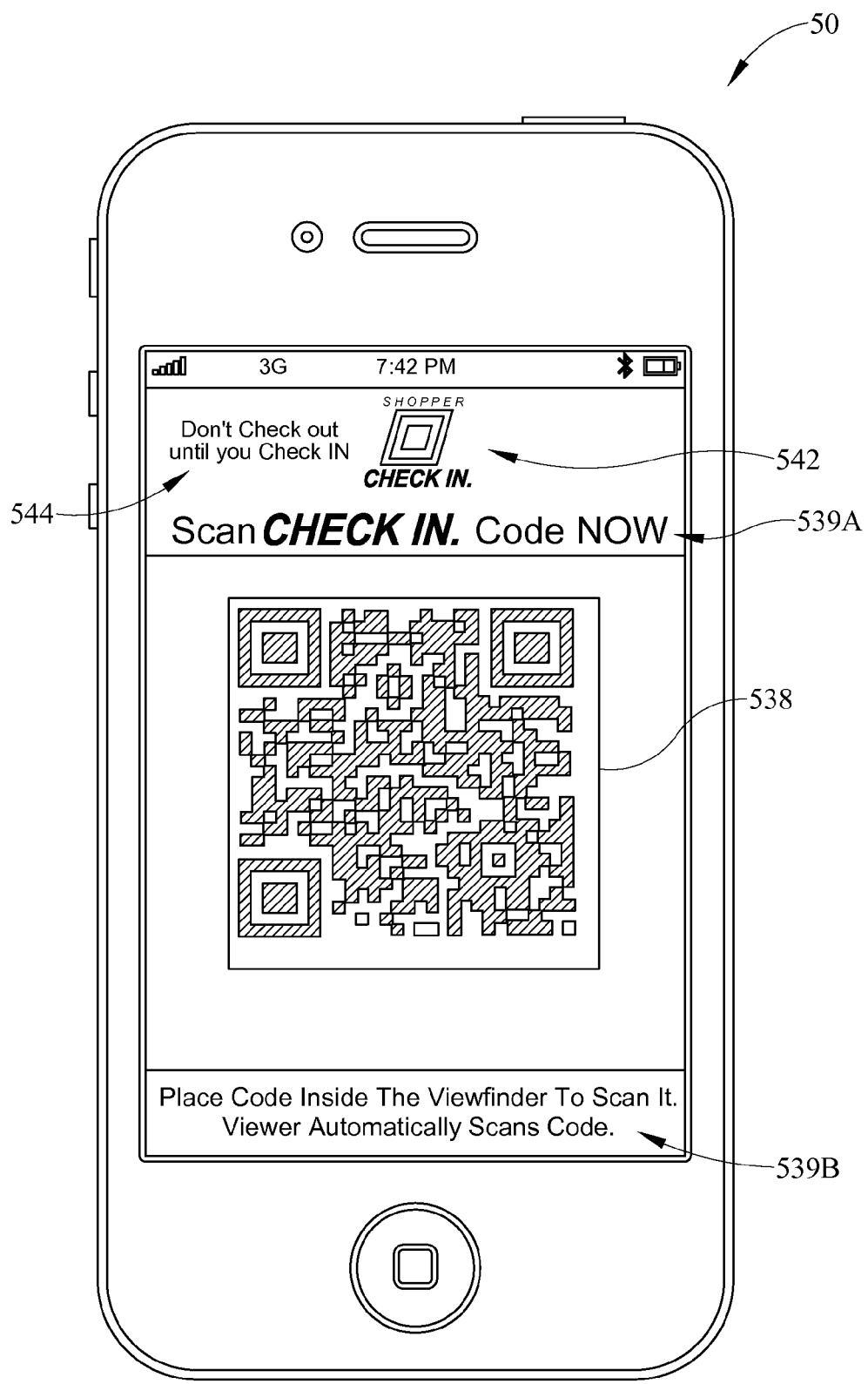
FIG. 3 illustrates the mobile electronic device displaying a check-in screen of the embodiment of the application for checking-in to a physical store.

Located below the ticker area 548 is a check-in button 550 that, when actuated by a shopper, will enable the shopper to check-in to a store as described in detail herein. For example, the check-in button 550 may direct the mobile phone 50 to a check-in screen such as the embodiment of the check-in screen of FIG. 3. Referring to FIG. 3, an image 538 of the check-in barcode 38 is visible in a viewfinder area of the screen of the cell phone 50. The image 538 may be visible when a shopper is holding the mobile phone 50 such that a camera thereof has the check-in barcode 38 in its field of view at a sufficiently close distance to capture and/or read contents thereof. The image 538 may optionally remain visible for an amount of time to provide the shopper with verification that the check-in barcode 38 was scanned by the mobile phone 50. Instructions 539A and 539B are provided above and below, respectively, the viewfinder area of the mobile phone 50 and instruct the shopper how to scan the check-in barcode 38. Optionally, video, images, and/or audio may be provided in the viewfinder area and/or elsewhere on the screen or from the mobile phone 50 to additionally or alternatively instruct the shopper how to scan the check-in barcode 38.

Figure 4:
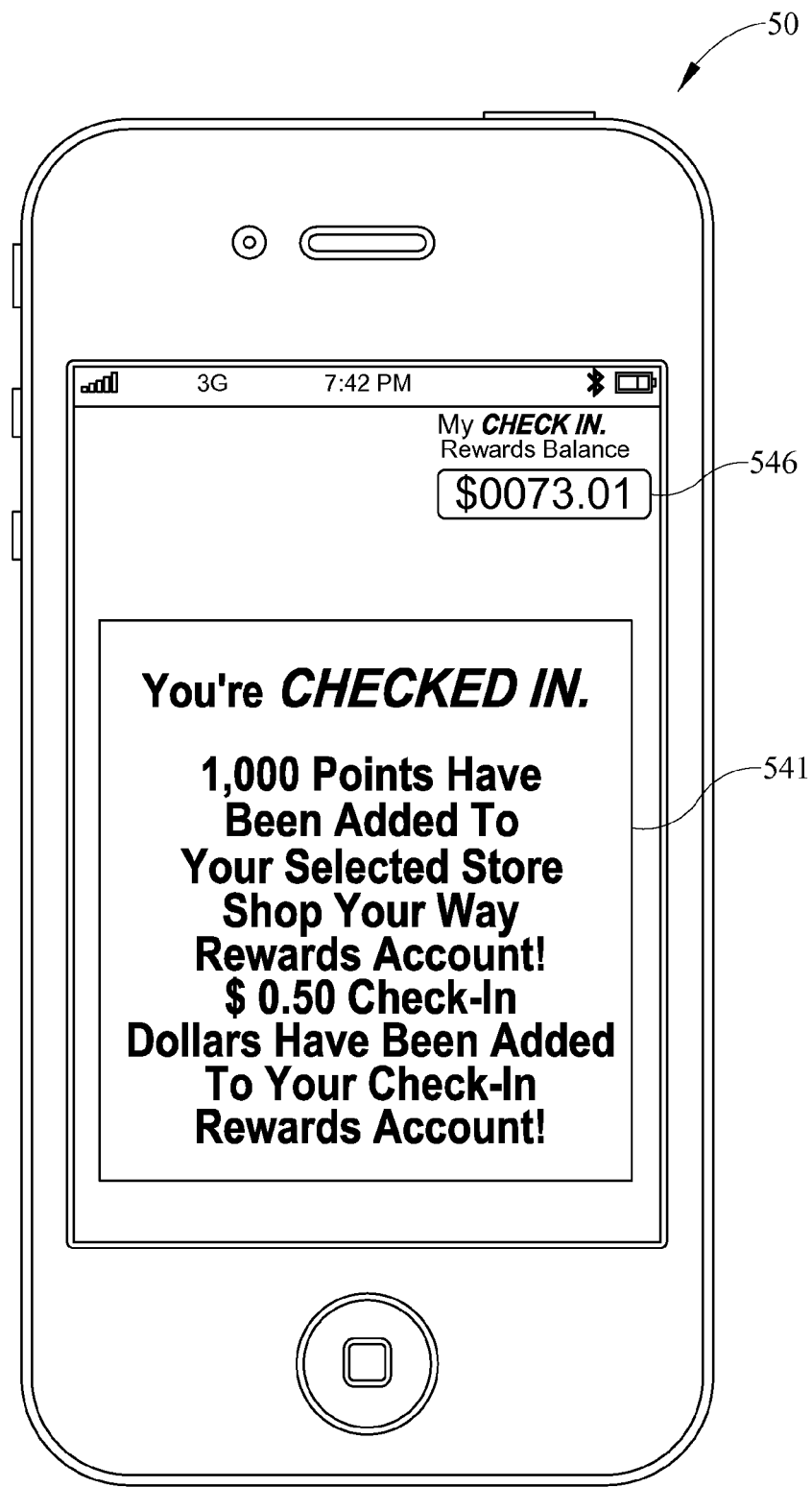
FIG. 4 illustrates a reward notification screen of the embodiment of the application for checking-in to a physical store.

Referring to FIG. 4, once the shopper has utilized the mobile phone 50 to scan the check-in barcode 38, a reward notification screen 541 may be displayed to the shopper. The reward notification screen 541 notifies the shopper of the application of a shopper's account check-in reward to the shopper rewards account of the shopper. The depicted notification screen 541 notifies the shopper that 1,000 points have been applied to a shopper rewards account of the shopper. The shopper rewards account may be a rewards account associated with the store that the shopper checked-in to or, alternatively, may be another store that the shopper has selected. For example, a store may provide shopper's account check-in reward points to a shopper when that shopper checks-in to that store. The store may optionally additionally provide shopper's account check-in rewards points to a shopper when that shopper checks-in to an affiliated store.

The reward notification screen 541 also notifies the shopper of the application of a pecuniary check-in reward to the shopper's check-in rewards account and the amount of the reward ($0.50). The reward notification screen 541 may be in the form of a pop-up type screen displayed for a period of time or until recognized by a user and/or a new screen that is displayed for a period of time or until recognized by a user. Optionally, the reward notification screen 541 may be two separate screens (simultaneously or separately displayed) that may separately display the pecuniary check-in reward and the shopper's account check-in reward. Also, as discussed herein, in certain embodiments of the application and/or when checking-in to certain stores, only the pecuniary check-in rewards may be earned. For example, only pecuniary check-in rewards may be earned when the store does not have a shopper rewards program or when the shopper is not registered with the store's shopper rewards program.

Alternatively, a reward notification may, for example, be displayed in the ticker area 548 or may be otherwise displayed to a user substantially instantaneously following scanning of the check-in barcode 38. For example, the pecuniary rewards notification screen 546 may be updated upon the scanning of the check-in barcode 38, to thereby notify the shopper that a pecuniary check-in reward has been applied to a pecuniary check-in reward account of the user. For example, the pecuniary check-in rewards notification screen 546 indicates a balance of $73.01. The shopper may look at the balance and compare it to the previous known balance of $72.51 to ascertain the amount of the pecuniary check-in reward applied by scanning of the check-in barcode 38. Alternatively, the check-in rewards bar 546 may separately display (temporarily or permanently) the amount of the most recently applied pecuniary check-in reward and/or a user may actuate the check-in rewards bar 546 to view a listing of the amount of one or more recent applied pecuniary check-in reward(s). Audio and/or video generated on the mobile phone 50 may additionally and/or alternatively notify the shopper of the application and/or amount of the pecuniary check-in reward and/or of the shopper's account check-in reward.

Optionally, the application may interface with one or more social networking applications such as, for example FACEBOOK, TWITTER, and/or other social networking application. For example, upon checking-in to a store utilizing a mobile electronic device to scan a check-in barcode 38, a user may be presented with the option to post a status update or other update to their social networking account notifying other users that they have checked-in to a particular store. Optionally, the update may provide information concerning the amount of the pecuniary check-in reward that was received for checking-in and/or how the pecuniary check-in reward was applied (e.g., a percentage applied to help a charity). Optionally, the application may be configured to interface with and automatically post updates to one or more social networking applications without manual prompting by a shopper.

The application may also interface with one or more social networking applications to enable a shopper to share product reviews, share details regarding sales, and/or share information concerning further pecuniary rewards. A shopper may share such information or other information with all social networking friends or optionally share information only with friends from a selected group. For example, a shopper may share only with: friends only from a selected social networking application; friends who are also user's of the application; friends who belong to a shoppers group; etc.

As described in detail herein, in some embodiments the shopper may choose to apply pecuniary check-in rewards in one or more of a variety of different ways. For example, in some embodiments the shopper may choose to apply pecuniary check-in rewards partially to charity and partially to a shopper rewards card. Also, for example, in some embodiments the shopper may choose to receive all pecuniary check-in rewards as cash and receive a portion of the cash and donate another portion of the cash to a friend.

Referring again to FIG. 2, a tutorial/help button 552 is adjacent the check-in button 550 and, when actuated by a shopper, will display content that assists a shopper in utilizing the application. For example, content such as text, images, audio, and/or video may be provided that instructs a shopper how to utilize the check-in feature, how to link shopper information to the application, how to link a shopper's rewards card(s) to the application, and/or how to utilize other features of the application. The deals may optionally be tailored to correspond with stores the shopper has previously checked-in to and/or that are related to such stores.

A matrix of icons 554-576 are provided below the check-in button 550 and the tutorial/help button 552. A daily deals icon 554, when actuated, may provide information concerning promotions, coupons, or other deal related information pertaining to one or more stores and/or one or more products. For example, clicking on the daily deals icon 554 may direct the mobile phone 50 to a web page containing a listing of the most popular deals for the day from a variety of retail stores. For example, the web page may be a forum that contains discussion regarding popular deals as posted and voted on by a variety of users. Also, for example, the web page may be a generated listing of editor selected top daily deals from retail stores that interface with the application.

A coupons to card icon 556, when actuated, may provide the ability to peruse manufacturer coupons, select one or more coupons of interest, and load those coupons to a shopper rewards card for future use. For example, clicking on the coupons to card icon 556 may direct the mobile phone 50 to a listing of active coupons by category, manufacturer, and/or store and enable the shopper to load those coupons to a shopper rewards card, to multiple shopper rewards cards, and/or to the application for future use. A national ads icon 558, when actuated, may provide a listing of national ads of various stores and provide a shopper the ability to peruse a selected of the national ads as desired. A user may be able to select items within a given ad to thereby add such items to a shopping list feature of the application. Items may also be added to the shopping list feature by scanning a barcode of the item (e.g., before discarding an empty item). A recipes icon 560, when actuated, may provide access to one or more recipes. For example, clicking on the recipes icon 560 may provide access to a web site that enables perusal of recipes by ingredient, by brand, by popularity, etc. If a user likes a given recipe they may be able to add the recipe ingredients to the shopping list feature of the application. Also, the application may determine if any of the ingredients of the recipe have an active coupon and, if so, add the coupon to the pertinent (e.g., as selected by a user and/or of the store the shopper is in) shopper rewards card of the shopper.

A gift cards icon 562, when actuated, may provide the ability to purchase a gift card for one or more stores. For example, clicking on the gift cards icon 562 may direct the mobile phone 50 to a listing of stores and enable a user to purchase a desired denomination of gift card to that store. Optionally, the gift card may be loaded to the application for use and/or may be loaded to a shopper rewards card associated with a selected store. In some embodiments the gift card may be loaded to the application of another shopper (e.g., to a friend as a gift) and/or another shopper's shopper rewards card. Also, in some embodiments, the gift card may be purchased, in whole or in part, utilizing earned pecuniary check-in rewards and/or further pecuniary rewards described herein.

A check-in rewards icon 564, when actuated, may provide additional information related to earned check-in rewards. For example, when actuated, the check-in rewards icon 564 may direct the mobile phone 50 to one or more screens that include information related to a shopper's check-in rewards history, current check-in rewards offered by various stores, a listing of stores participating in check-in rewards, a shopper's current check-in rewards utilization settings, tying a shopper's account check-in rewards into one or more shopper's rewards cards, tying pecuniary check-in rewards into a bank account, providing demographic information for utilization in applying and/or utilizing the check-in rewards, utilizing check-in rewards, etc.

Figure 6:
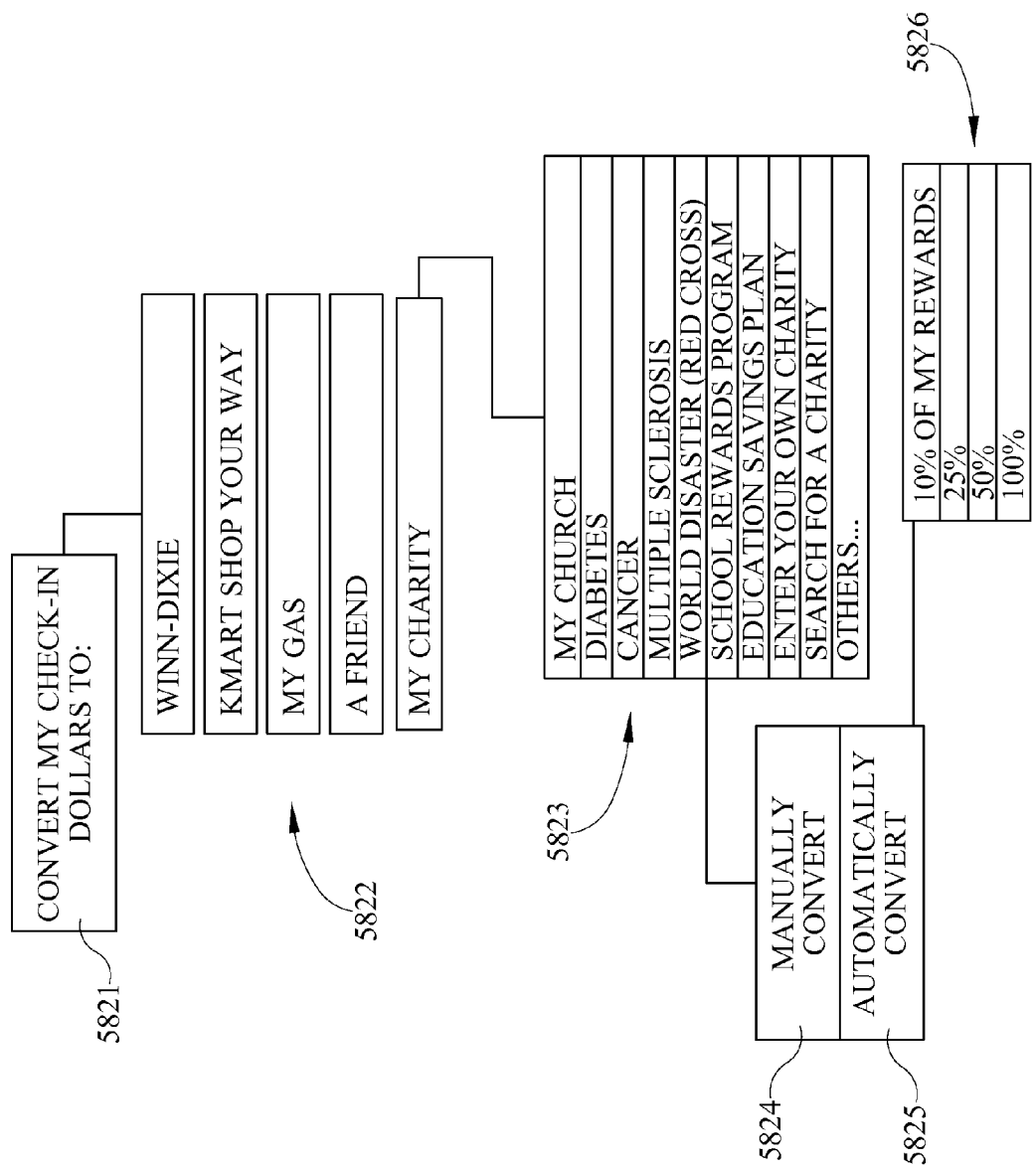
FIG. 6 illustrates a pecuniary check-in reward utilization screen of the embodiment of the application for checking-in to a physical store.

Referring to FIG. 6, a pecuniary check-in reward utilization screen of the embodiment of the application for checking-in to a physical store is illustrated. The pecuniary check-in reward utilization screen may be one screen accessible via actuation of the check-in rewards icon 564. Several different buttons (generally indicated at 5821-5826) are displayed in FIG. 6. It is understood that all buttons 5821-5826 may not be displayed at once and that certain buttons 5822-5826 may not be displayed until certain other precursor buttons 5821-5825 are actuated.

Actuation of the check-in dollars conversion button 5821 displays a list of conversion options 5822. The options include "Winn-Dixie," "Kmart Shop Your Way," "My Gas," "A Friend," and "My Charity." Selection of Winn-Dixie or Kmart Shop Your Way will enable the shopper to manually or automatically convert all or a portion of the pecuniary check-in dollars to points, coupons, or other pecuniary interest in respective shoppers rewards cards of Winn-Dixie and Kmart. For example, the shopper may choose to automatically convert 100% of the check-in dollars to points on a shopper's rewards card and, upon checking-in to a store, pecuniary check-in rewards may be converted to such points. The conversion of the pecuniary check-in rewards may be in addition to the separate shopper's account check-in rewards rewarded by the store's shopper rewards program upon checking-in. Also, for example, the shopper may choose to periodically manually convert pecuniary check-in dollars to shopper rewards points and, upon checking-in to a store, receive check-in dollars that may later be converted to shoppers rewards points. The shopper may be prompted to supply information concerning the respective shoppers rewards cards so that the application may appropriately apply the check-in dollars, so that the shopper may appropriately check-in to a store, and/or so that shopper's account check-in rewards may be applied. For example, the shopper may be prompted to enter demographic data, data on their shopper rewards card, and/or scan their shopper rewards card utilizing the mobile phone 50.

Selection of My Gas will enable the shopper to manually or automatically convert all or a portion of the check-in dollars to points, coupons, or other pecuniary interest that may be utilized at one or more gas stations. Optionally, the pecuniary interest may be loaded onto a shopper's rewards card associated with the gas station. Alternatively or additionally, the pecuniary interest may be mailed or electronically sent (e.g., via the mobile phone 50) to a shopper in the form of coupons, points, gift cards, etc. The shopper may be prompted to supply information concerning the respective shoppers rewards cards, desired gas station, etc. so that the application may appropriately apply the check-in dollars.

Selection of A Friend will enable the shopper to manually or automatically convert all or a portion of the check-in dollars to a desired non-charitable third party. Optionally, the pecuniary interest may be loaded onto a third party's shopper rewards card associated with a store. Alternatively or additionally, the pecuniary interest may be applied to a third party's check-in dollars for utilization by the third party as desired. Alternatively, the pecuniary interest may be mailed or electronically sent (e.g., via e-mail, via EFT, via a social networking application) to a third party in the form of coupons, points, gift cards, cash, check, etc. The shopper may be prompted to supply information concerning the third parties so that the application may appropriately apply the check-in dollars.

Selection of My Charity, displays a listing of charities 5823. The charities may be automatically populated, populated based on selections by a user (e.g., searching a database of charities), and/or populated based on demographic or other data of a user. Optionally, for an unrecognized charity, the shopper may be prompted for additional information concerning the charity (e.g., the charity's name, address, tax ID number). Also, a shopper may be prompted to enter information to be eligible for a tax deduction (e.g., shopper's name, address, tax ID number) so that a receipt may be sent to the shopper.

Selection of a particular charity from the listing of charities 5823 may provide the shopper with the option to manually convert check-in dollars 5824 or automatically convert check-in dollars 5825. Manually converting check-in dollars 5824 enables a shopper to select a desired amount of earned check-in dollars (e.g., a specific dollar amount or a specific percentage) to apply to a selected charity on a one-time basis. Automatically converting check-in dollars 5825 enables a shopper to select a percentage (e.g., percentages 5826 or a manually entered percentage) of earned check-in dollars to automatically apply to a selected charity. The shopper may choose to apply all previously earned check-in dollars and check-in dollars going forward, or just check-in dollars going forward.

Although particular check-in dollar conversion options are depicted in FIG. 6, one of ordinary skill in the art, having had the benefit of the present disclosure, will recognize and appreciate that in alternative embodiments additional and/or alternative check-in dollar conversion options may be provided. For example, in some embodiments a cash-out check-in dollar conversion option may be provided. A shopper may choose to have check-in dollars applied directly to an entered bank account (their own or a third parties') or to have a check mailed to them. The check-in dollars may convert to actual cash on a one to one basis in some embodiments or, in alternative embodiments, optionally convert on an alternative basis. Also, for example, in some embodiments a shopper may choose to convert check-in dollars earned in selected stores to certain rewards cards, third parties, etc. and convert check-in dollars earned in selected other stores to other rewards cards, third parties, etc. For example, check-in dollars earned in a given store may optionally be worth more if converted to that store's rewards card than if converted to another store's rewards card.

Referring again to FIG. 2, a scan/compare icon 566 is provided that, when actuated, may provide the ability to scan a barcode of an item within a store and locate additional information concerning the item. For example, clicking on the scan/compare icon 566 may enable the mobile phone 50 to scan an item and, upon scanning of the item, provide a listing of other stores that have the item and the price of the item at other stores. Also, for example, upon scanning of an item, competing products in the store may be displayed (e.g., generic brands) and optionally, information concerning those competing products (e.g., price, features).

A brand detergent icon 568 is also provided that, when actuated, may provide a user with instructions concerning treating stains utilizing a certain brand of detergent. A food icon 570 is also provided that, when actuated, may provide a user with information (e.g., specials, nutritional information) concerning foods from a certain manufacturer. A mobile cookbook icon 572 is also provided that, when actuated, may provide a user with recipes that utilize one or more products from a particular manufacturer. A kitchen icon 574 is also provided that, when actuated, may provide a user with recipes and/or other information concerning products from a particular manufacturer. Optionally, the detergent icon 568, the food icon 570, the mobile cookbook icon 572, and/or the kitchen icon 574 may be sponsored by one or more manufacturers. Optionally, revenue from the sponsorship(s) may be utilized in one or more of the pecuniary rewards described herein.

A baby registry icon 567 is also provided that, when actuated, may enable a shopper to view products from another shopper's baby registry and/or edit their own registry. The baby registry icon 567 may optionally be tied into a registry at a particular store, may combine registries from a plurality of stores, and/or may serve as a standalone registry. The baby registry icon 567 may enable a user to scan an item's barcode utilizing the mobile phone 50 to add/remove that item from their registry and/or to notify another registry that they are purchasing an item on that registry.

An advertisement/coupon banner 578 is provided below the icons 554-576. The banner 578 may display one or more sponsored advertisements. Optionally, a shopper may click the banner 578 to obtain additional information regarding the advertisement. For example, the shopper may click the banner 578 to be redirected to a website to purchase the product being advertised.

Provided below the banner 578 are additional buttons 580-588. The Home button 580, when actuated, may direct the shopper to the home screen depicted in FIG. 2 (for example, when the shopper has navigated to another screen). The My Rewards button 582, when actuated, may direct the shopper to a screen that provides details concerning earned rewards. Optionally, the screen may contain information concerning earned pecuniary check-in rewards described in detail herein in addition to further pecuniary or other rewards that may be earned by a shopper, as described in detail herein. The My Stores button 584, when actuated, may direct the shopper to a screen that provides details concerning stores that the shopper has visited and/or has listed as favorite stores. For example, the screen may provide details on specials at selected stores, current check-in rewards offered at selected stores, etc. The My List button 586, when actuated, may direct the shopper to a screen that provide details concerning user generated lists such as, for example, shopping lists described herein, to do lists, etc. The More button 588, when actuated, provides access to additional icons and/or buttons having additional functionality.

Figure 5:
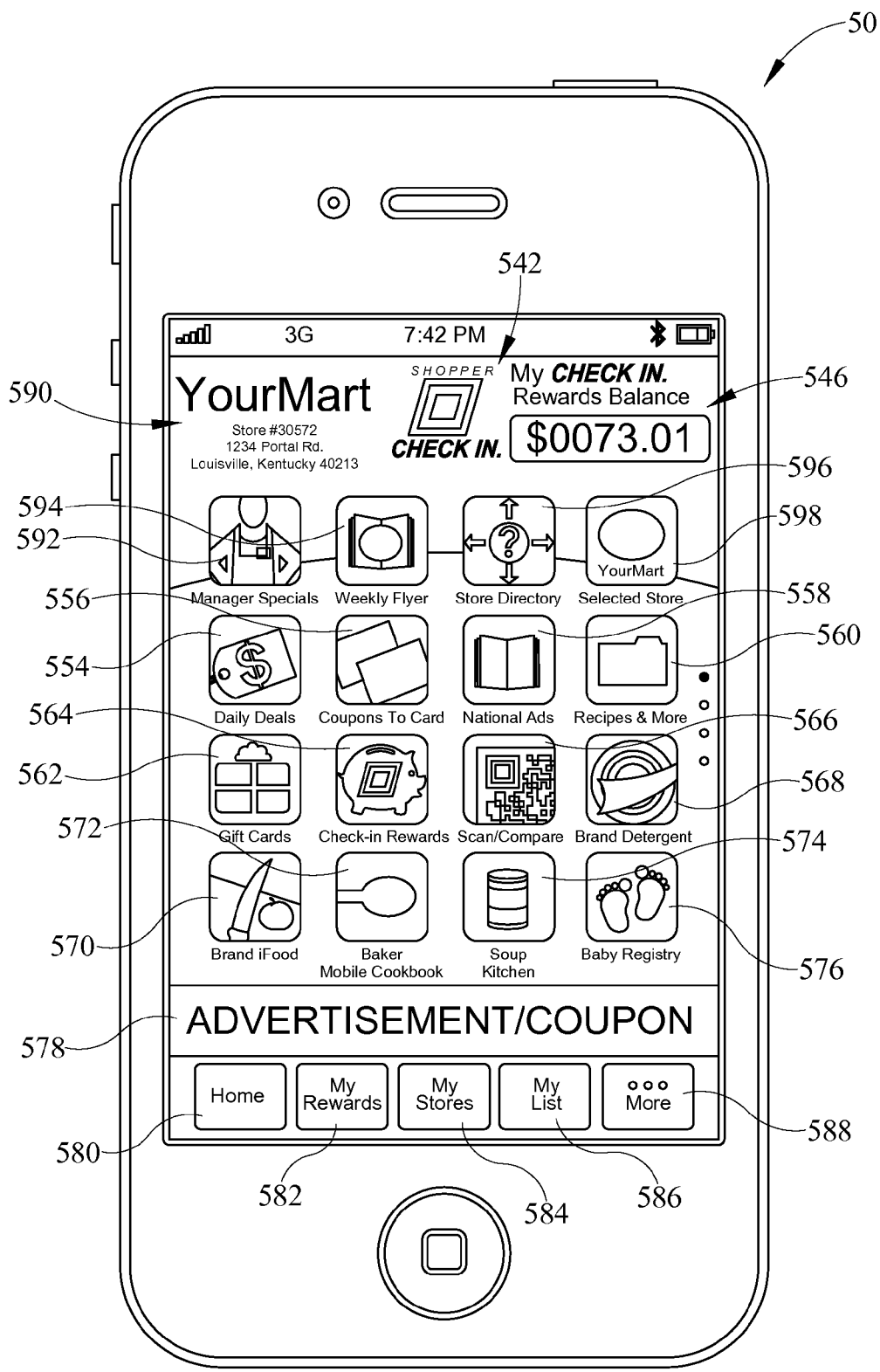
FIG. 5 illustrates a physical store home screen of the embodiment of the application for checking-in to a physical store.

Referring now to FIG. 5, a physical store home screen of the embodiment of the application for checking-in to a physical store is depicted. The store home screen is optionally displayed after the user has checked-in to a given physical store. The store home screen contains many of the same icons and buttons as the home screen, but also includes store specific information 590 and store specific icons 592-598. The store specific information 590 provides the name of the store that the shopper has checked-in to, in addition to the store number and address. The store specific icons 592-598 include a manager specials icon 592, a weekly flyer icon 594, a store directory icon 596, and a selected store icon 598. The manager specials icon 592, when actuated, may list specials that may be in addition to regular specials such as, for example, specials dictated by a manager due to over ordering. Also, for example, the manager specials icon 592 may include specials that are provide to selected shoppers only such as, for example, shoppers that: are frequent shoppers to the store; new shoppers to the store; typically shop at a competing store; have certain attributes; etc., as determined by, for example, the application, store rewards program(s) interfacing with the application, marketing service(s) interfacing with the application, and/or supplied demographic information. For example, the application may determine that the shopper typically shops at grocery store A and, if the shopper checks-in to grocery store B, may offer the shopper additional specials to grocery store B.

The weekly flyer icon 594, when actuated, provides a link to the weekly (or other period) flyer that contains the store's current specials. Optionally, the flyer may be tailored to the particular shopper. For example, the first pages of the flyer may display items that may interest the shopper more than items on the latter pages of the flyer. A shopper's interest may be determined by, for example, the application, store rewards program(s), marketing services, and/or supplied demographic information. The store directory icon 596, when actuated, provides a link to a map of the store and/or to an optionally searchable index of the store to assist a shopper in locating particular items. Optionally, the store directory icon 596 may be tailored to the particular shopper. For example, the location of certain items that may interest the shopper may be highlighted in the store directory. The selected store icon 598, when actuated, may link to information pertaining to the checked-in store. For example, store hours, store features, current store check-in rewards, and/or current further pecuniary rewards may be provided upon actuation of the selected store icon 598.

One or more of the icons and buttons 554-598 described herein may direct a user to a web page or other content that contains paid-for material. For example, placement of coupons when the coupons to card icon 556 is selected, may be dictated at least in part by whether a manufacturer has paid for premium placement. Also, for example, the listing of available gift cards may be dependent, at least in part, by whether a manufacturer has paid for placement in the listing. Also, for example, icons 568-576, ticker 548, and banner 578 may optionally contain paid-for material. The check-in dollars that are applied to a shopper's check-in rewards may optionally be derived from such paid-for material and/or from one or more of a variety of other sources. For example, the check-in dollars may additionally or alternatively be derived from a participation fee derived from stores for enabling the stores to interface with the check-in rewards application. Optionally, the check-in dollars that are applied to a shopper's check-in rewards may be a fixed percentage (optionally with a cap) of revenue derived from certain sources.

One or more of the icons 554-598 described herein may direct a user to a web page or other content that is at least partially tailored to a shopper. For example, information displayed upon actuation of the daily deals icon 554 may be based at least in part on the purchasing history of the shopper and/or demographics of the shopper. Also, one or more of the icons 554-598 may be based at least in part tailored to a particular shopper and tailored to the store that the shopper has checked-in to. For example, one or more of the icons may be tailored to a shopper based on his demographics and/or shopping history (as determined by the application, from one or more interfacing shoppers rewards programs, and/or information from one or more shopper marketing companies) and may also be tailored to the store that the shopper has checked-in to. For example, the coupons to card icon 556 may be tailored to include only items that are within the store that the shopper has checked-in to and to include only items that compete with items the shopper has previously purchased.

Although particular icons are depicted and described herein, one of ordinary skill in the art, having had the benefit of the present disclosure, will recognize and appreciate that in alternative embodiments one or more of the icons may be replaced with other icons, buttons, and/or links. For example, other icons such as a health icon that displays health information concerning foods, a pharmacy icon that displays information pertaining to a store's pharmacy, a wedding registry icon, a social networking icon that provides access to a social networking application and/or one or more social networking features, and/or a product recall icon that displays information pertaining to product recalls (optionally, based upon a shopper's purchase history) may additionally or alternatively be provided. The particular icons that are displayed may optionally be partially or wholly dictated by a user. Moreover, actuation of the depicted or alternative icons by a shopper may result in additional and/or alternative functionality than described herein.

Figure 7:
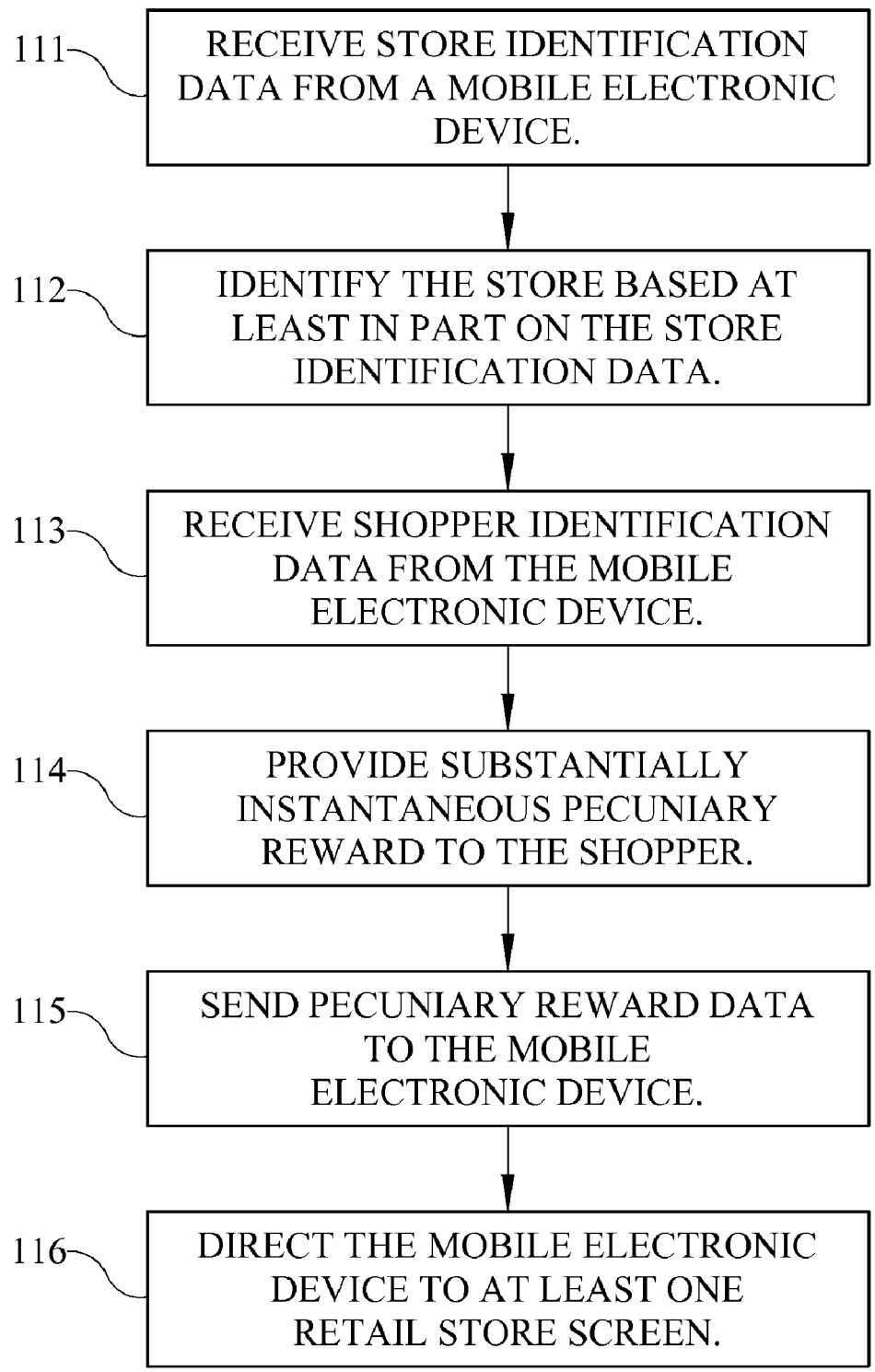
FIG. 7 illustrates a flowchart of an embodiment of providing a substantially instantaneous pecuniary reward to a mobile electronic device.

Referring now to FIG. 7, a flowchart of an embodiment of providing a substantially instantaneous pecuniary reward to a mobile electronic device is illustrated. At step 111 store identification data from a mobile electronic device such as, for example, mobile phone 50, a tablet computer, or PDA is received. The store identification data is encoded in the check-in barcode of the store that was scanned by the mobile electronic device. In some embodiments software on the mobile electronic device decodes the check-in barcode and supplies store identification data contained therein. In other embodiments the mobile electronic device may provide an image of the check-in barcode and store identification data contained therein is decoded therefrom.

At step 112, the store is identified based at least in part on the received store identification data. In some embodiments the store is identified based wholly on store identification data. In other embodiments the store may be identified based on store identification data and geolocation data. Geolocation data includes electronic data supplied by the mobile electronic device that indicates (directly or indirectly) the location thereof such as GPS data, cell phone tower data, and/or IP address data. The geolocation data may be utilized to verify that the shopper is actually at a store (e.g, to verify that the shopper is not scanning a copied check-in barcode). In some embodiments the check-in barcode at a store may be periodically changed at the store (and updated in the database) to minimize copying of check-in barcodes. The geolocation data may additionally or alternatively be utilized to help narrow which store a user is at out of a plurality of stores indicated in the store identification data. For example, the store identification data may indicate a Winn-Dixie, but not specify the location. The geolocation data may be utilized to ascertain the exact location.

At step 113, shopper identification data is received from the mobile electronic device. The shopper identification data may include, for example, one or more shopper rewards numbers, demographic data supplied by the user, and/or an internal shopper identification number utilized to identify a user of the application. For example, each user of the application described herein may be referenced with an internal shopper identification number to identify the user. The shopper identification number may be sent by the mobile electronic device. Also, for example, each user of the application described herein may be referenced with an identifying number of the mobile device (e.g., phone number, SIM number, or other identifier) that may be sent by the mobile electronic device.

At step 114, a substantially instantaneous pecuniary check-in reward is provided to the shopper. For example, a pecuniary check-in reward is credited to the check-in rewards account. The pecuniary check-in reward may be standard or may based on one or more factors. For example, the reward may be based on which store the shopper checked-in to, how many times the user has checked-in to the store, what other stores the shopper has checked-in to, the purchasing history of the shopper, how many times the shopper has checked-in to other stores, and/or demographics information of the shopper. As discussed herein, a separate shopper's account check-in reward may also optionally be applied and credited to the shopper's shopper rewards account. The shopper's account check-in reward may be standard or may be based on one or more factors such as, for example, which store the shopper checked-in to, how many times the user has checked-in to the store, what other stores the shopper has checked-in to, the purchasing history of the shopper, how many times the shopper has checked-in to other stores, and/or demographics information of the shopper.

At step 115, pecuniary check-in reward data is sent to the mobile electronic device. The pecuniary check-in reward data may include data that enables the mobile electronic device to notify the shopper that a pecuniary check-in reward has been applied to the shopper's account. Optionally, detailed information regarding the amount of the pecuniary check-in reward may also be provided. Also, optionally, the shopper may be provided with additional pecuniary check-in reward data such as the total of all pecuniary check-in rewards that the shopper has received and not yet utilized. Separate shopper's account check-in reward data may also optionally be sent to the mobile device that may enable the mobile electronic device to notify the shopper that shopper's account check-in reward points have been credited to the shopper's shopper rewards account.

At step 116, the mobile electronic device is directed to at least one retail store screen that contains data specifically tailored to the specific retail store. Optionally, the retail store screen (or screens accessible therefrom) may additionally contain data specifically tailored to the shopper as described herein. In some embodiments a server may direct the mobile electronic device to a screen and may optionally load data to the mobile electronic device. In other embodiments the mobile electronic device may automatically direct itself to a retail store screen. For example, in some embodiments the check-in barcode may contain a link to a store specific web page and the mobile electronic device may navigate to that page following scanning of the check-in barcode. In some of those embodiments the mobile electronic device may further navigate to a shopper specific page based on, for example, shopper identification data (e.g., shopper rewards number; application account number; mobile phone ID data).

Figure 8:
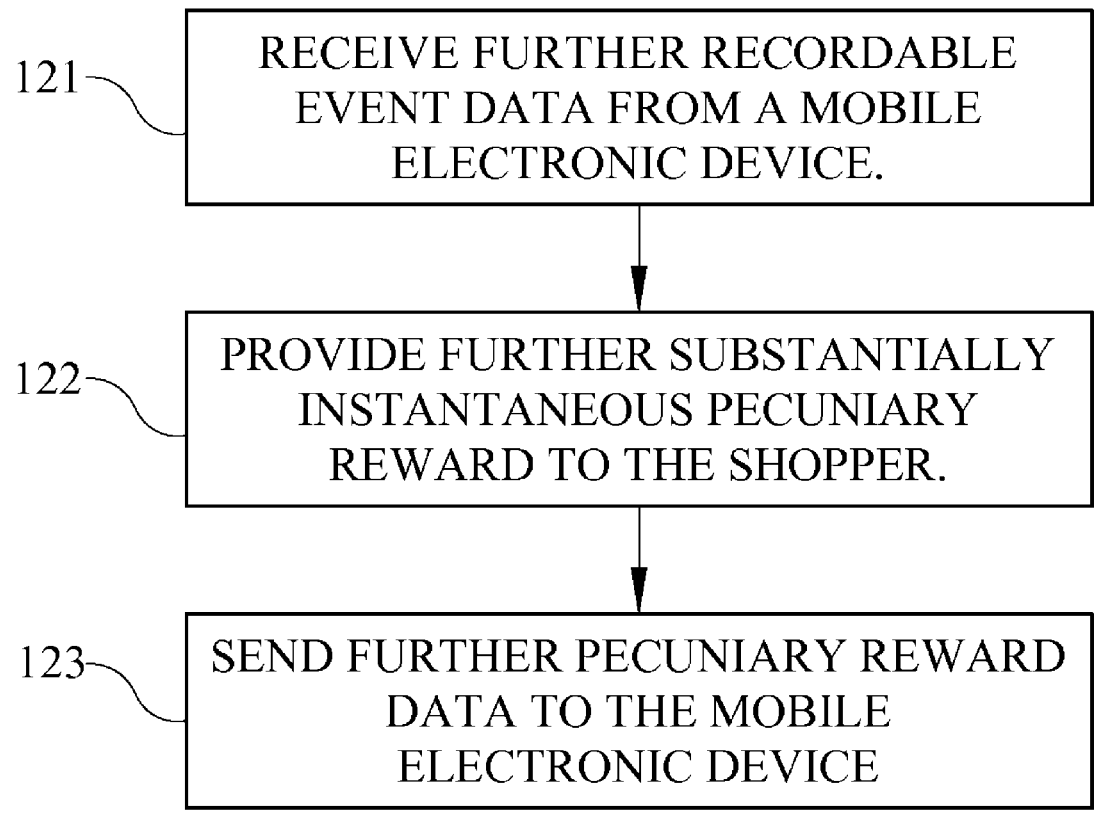
FIG. 8 illustrates a flowchart of an embodiment of providing a substantially instantaneous further pecuniary reward to a mobile electronic device.

Referring now to FIG. 8, a flowchart of an embodiment of providing a substantially instantaneous further pecuniary reward to a mobile electronic device is illustrated. The further pecuniary reward is separate and distinct from the pecuniary check-in reward and is rewarded for an action that occurs after checking-in. The further pecuniary reward may be in the form of cash, vouchers, gift cards, etc. The further pecuniary reward may be kept in an account separate from the pecuniary check-in rewards or may optionally be combined with the pecuniary check-in rewards account.

At step 121, further recordable event data is received from a mobile electronic device or from another device. For example, data that indicates a user has viewed recipes via the mobile cookbook icon 572 may be transmitted by the mobile device and/or by a server hosting the mobile cookbook. Also, for example, data that indicates a user has viewed an advertisement within banner 578 may be transmitted by the mobile device and/or a server hosting the advertisement or link associated with the advertisement. Also, for example, data that indicates a user has selected the coupons to card icon 556, applied a coupon, and purchased a product utilizing the coupon may be communicated from the mobile electronic device or from servers associated with a retail store. Also, for example, data that indicates a user has viewed recipes via the mobile cookbook icon 572 and purchased a product utilized in the recipe may be communicated from the mobile electronic device or from servers associated with a retail store.

At step 122 a further substantially instantaneous pecuniary reward is provided to the shopper. For example, substantially instantaneously upon receipt of data from the mobile electronic device and/or from another device that indicates the shopper has performed a further recordable action, a further pecuniary reward is credited to the shopper's account. The further pecuniary reward may be standard or may based on one or more factors. For example, the further pecuniary reward may be based on what the further action was, whether a product was actually purchased, what product (if any) is involved, the purchasing history of the shopper, and/or demographics information of the shopper.

At step 123, further pecuniary reward data is substantially instantaneously sent to the mobile electronic device. The further pecuniary reward data may include data that enables the mobile electronic device to notify the shopper that a further pecuniary reward has been applied to the shopper's account. Optionally, detailed information regarding the amount of the further pecuniary reward may also be provided. Also, optionally, the shopper may be provided with additional further pecuniary rewards data such as the total of all further pecuniary rewards that the shopper has received and not yet utilized. Also, optionally the shopper may be notified via the mobile electronic device that upon performing a further action additional further pecuniary rewards may be obtained. For example, upon viewing a recipe via the mobile cookbook icon 572 the shopper may be provided with a further pecuniary reward and notified that if one or more of the items in the recipe is purchased, an additional further pecuniary reward may be obtained.

The earned further pecuniary rewards may optionally be applied in a manner similar to that described with respect to pecuniary check-in rewards. For example, the further pecuniary rewards may optionally be converted from one format to another format (e.g., received in dollars and converted to rewards points). Also, for example, the further pecuniary rewards may optionally be automatically or manually applied to a third party, a charity, a bank account, etc.

Figure 9:
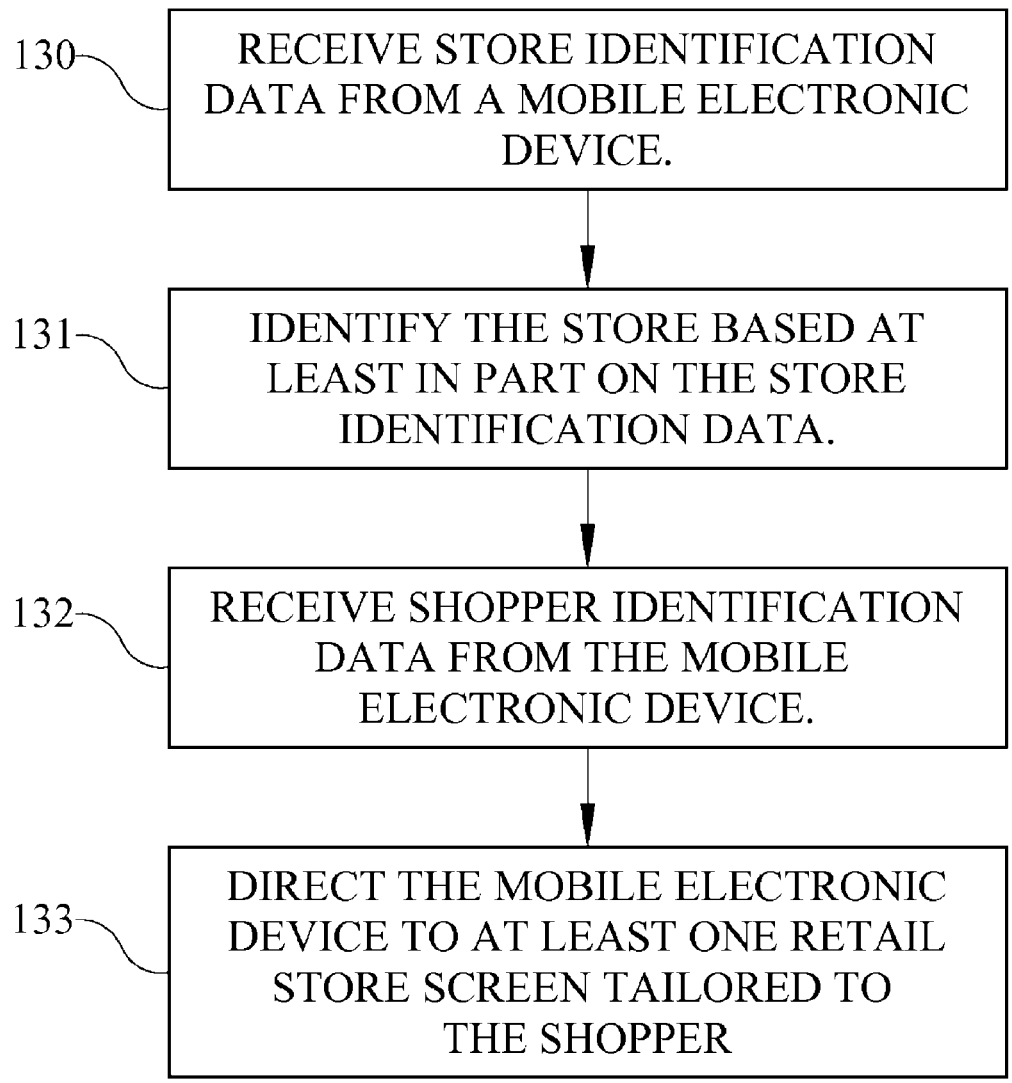
FIG. 9 illustrates a flowchart of an embodiment of providing at least one tailored retail screen to a shopper.

Referring now to FIG. 9, a flowchart of an embodiment of providing at least one tailored retail screen to a shopper is illustrated. At step 130, store identification data is received from a mobile electronic device. The store identification data may be encoded in the check-in barcode of the store that was scanned by the mobile electronic device. In some embodiments software on the mobile electronic device decodes the check-in barcode and supplies store identification data contained therein. In other embodiments the mobile electronic device may provide an image of the check-in barcode and store identification data contained therein is decoded therefrom.

At step 131 the store is identified based at least in part on the received store identification data. In some embodiments the store is identified based wholly on the store identification data. In other embodiments the store may be identified based on the store identification data and geolocation data.

At step 132 shopper identification data is received from the mobile electronic device. The shopper identification data may include, for example, one or more shopper rewards numbers, demographic data supplied by the user, mobile electronic device identification data, and/or an internal shopper identification number utilized to identify a user of the application.

At step 133, the mobile electronic device is directed to at least one retail store screen tailored to the shopper. For example, in some embodiments a shopper may select a store flyer icon within the application that directs the shopper to a store flyer that is specifically arranged based upon shopping habits, demographic data, or other information pertaining to the particular shopper. Also, for example, in some embodiments a shopper may be presented with specific specials based upon shopping habits, demographic data, or other information pertaining to the particular shopper.

Figure 10:
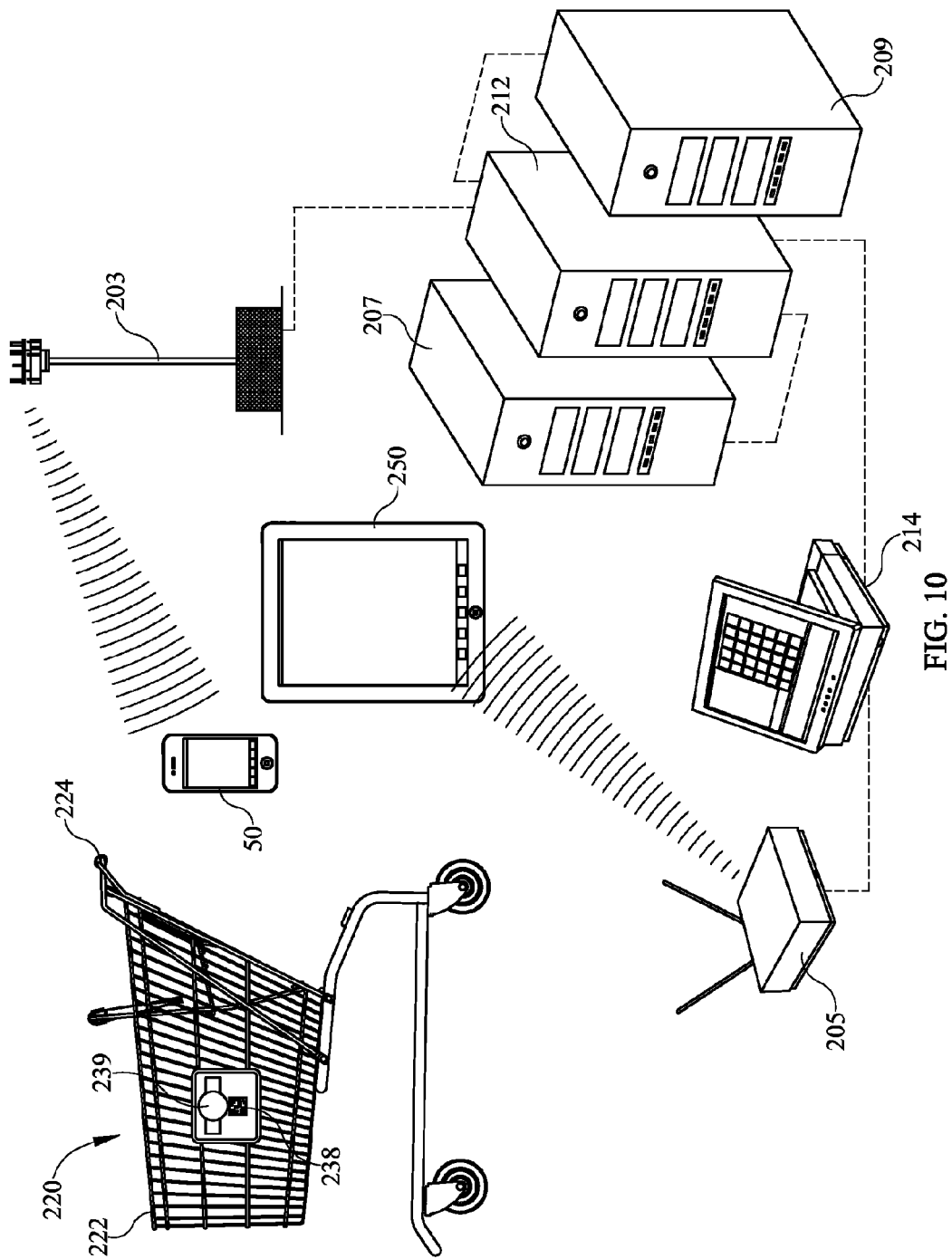
FIG. 10 illustrates an embodiment of a system for checking-in to a physical store.

Referring now to FIG. 10, an embodiment of a system for checking-in to a physical store is illustrated. A shopping cart 220 is illustrated having a basket 222 and a handle 224 extending rearward from the basket 222. A check-in barcode 238 is provided on an insert that is attached to a side of the basket 222. The insert includes instructions 239 related to utilization of the check-in barcode 238. Optionally, the insert is removably attached to the basket 222.

A mobile phone 50 and a tablet computer 250 are depicted in FIG. 10 interacting with the system for checking-in to a physical store. The mobile phone 50 and tablet computer 250 may be utilized to, inter alia, scan the check-in barcode 238. The mobile phone 50 is in network communication with a server 212 of the system via a cell phone tower 203 and data lines (including any associated intermediary switches, servers, etc.) extending between the cell phone tower 203 and server 212. The tablet computer 250 is in network communication with a wireless router 205 that is in communication with a server 212 of the system via an intermediary in-store computer 214 and data lines (including any associated intermediary switches, servers, etc.) extending between the in-store computer 214 and server 212. In alternative embodiments the tablet computer 250 may be in communication with the cell phone tower 203. The in-store computer 214 may be omitted in some embodiments and the router 205 may simply be connected directly to the internet or other network. Also, both the router 205 and the in-store computer 214 may be omitted in some embodiments.

The server 212 may perform one or more of the server side functions described herein. The mobile phone 50 and tablet computer 250 may perform one or more of the mobile electronic device side functions described herein. It is understood that the server 212 may optionally perform one or more mobile phone 50 and tablet computer 250 functions as desired (for example, when the mobile phone 50 and/or tablet computer 250 has limited functionality or when it is desirable to remotely perform some functions) and/or the mobile phone 50 and tablet computer 250 may optionally perform one or more of the functions of the server 212 (for example, when it is desirable to remotely perform some functions of the server 212). Optionally, the in-store computer 214 may be programmed to perform one or more of the functions that might otherwise be performed by the server 212. For example, the in-store computer 214 may be accessed by a user to program and/or deliver one or more aspects of store specific content to a user (via router 205 and/or server 212). For example, the in-store computer 214 may be utilized to deliver one or more manager specials to shoppers that utilize the application described herein via wi-fi in the store.

Also depicted in FIG. 10 is a store shopper rewards account server 207 and a marketing server 209 that are each in communication with the server 212. The store shopper rewards account server 207 may contain information pertaining to a store's shopper rewards account. In embodiments where separate shopper's account check-in rewards are provided, the store shopper rewards account server 207 may receive check-in information from server 212 to thereby enable the application of a shopper's account check-in reward to a shopper's shopper rewards account. The store shopper rewards account server 207 may also provide information to server 212 such as, for example, the amount of the shopper's account check-in reward provided to the shopper and/or the shopper's current shopper rewards balance. It is understood that the server 212 may be in communication with multiple shopper rewards account servers 207 that correspond to shopper rewards accounts of different stores.

The marketing server 209 may contain information pertaining to a shopper's purchasing history. For example, the marketing server 209 may include information from a marketing company such as, for example, CATALINA MARKETING of St. Petersburg, Fla. The marketing server 209 may provide information to server 212 that enables server 212 to deliver tailored information to a shopper. For example, information from the marketing server 209 may help tailor the store page and/or specials that a shopper sees after checking-in. The server 212 may provide identifying information (e.g., demographics, shopper rewards data, other identifier) of the shopper to the marketing server 209 to thereby enable the marketing server 209 to provide pertinent data for the shopper. It is understood that the server 212 may be in communication with multiple marketing servers 209.

Figure 11:
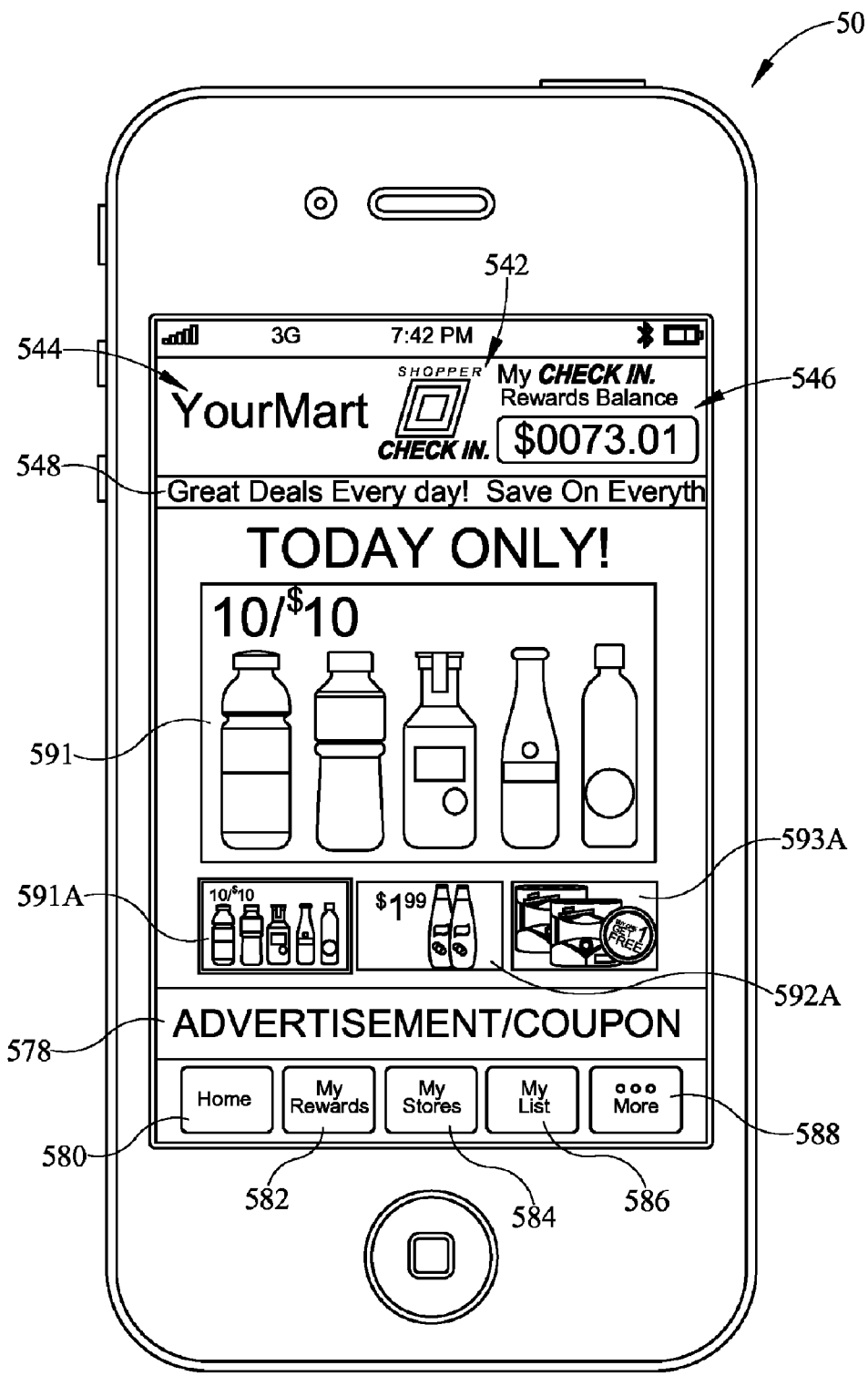
FIG. 11 illustrates a first targeted advertisement screen of the embodiment of the application for checking-in to a physical store.
Figure 12:
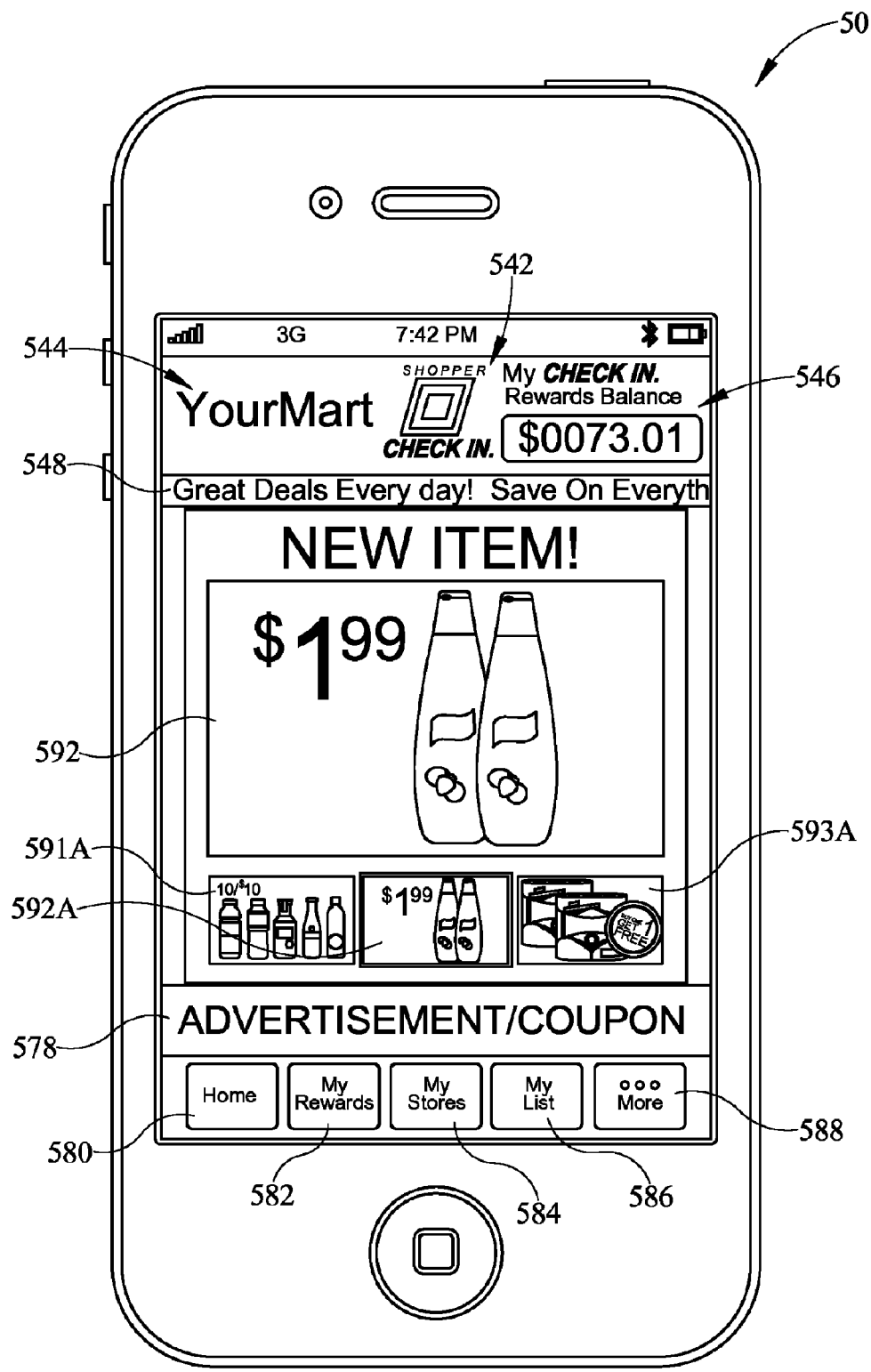
FIG. 12 illustrates a second targeted advertisement screen of the embodiment of the application for checking-in to a physical store.
Figure 13:
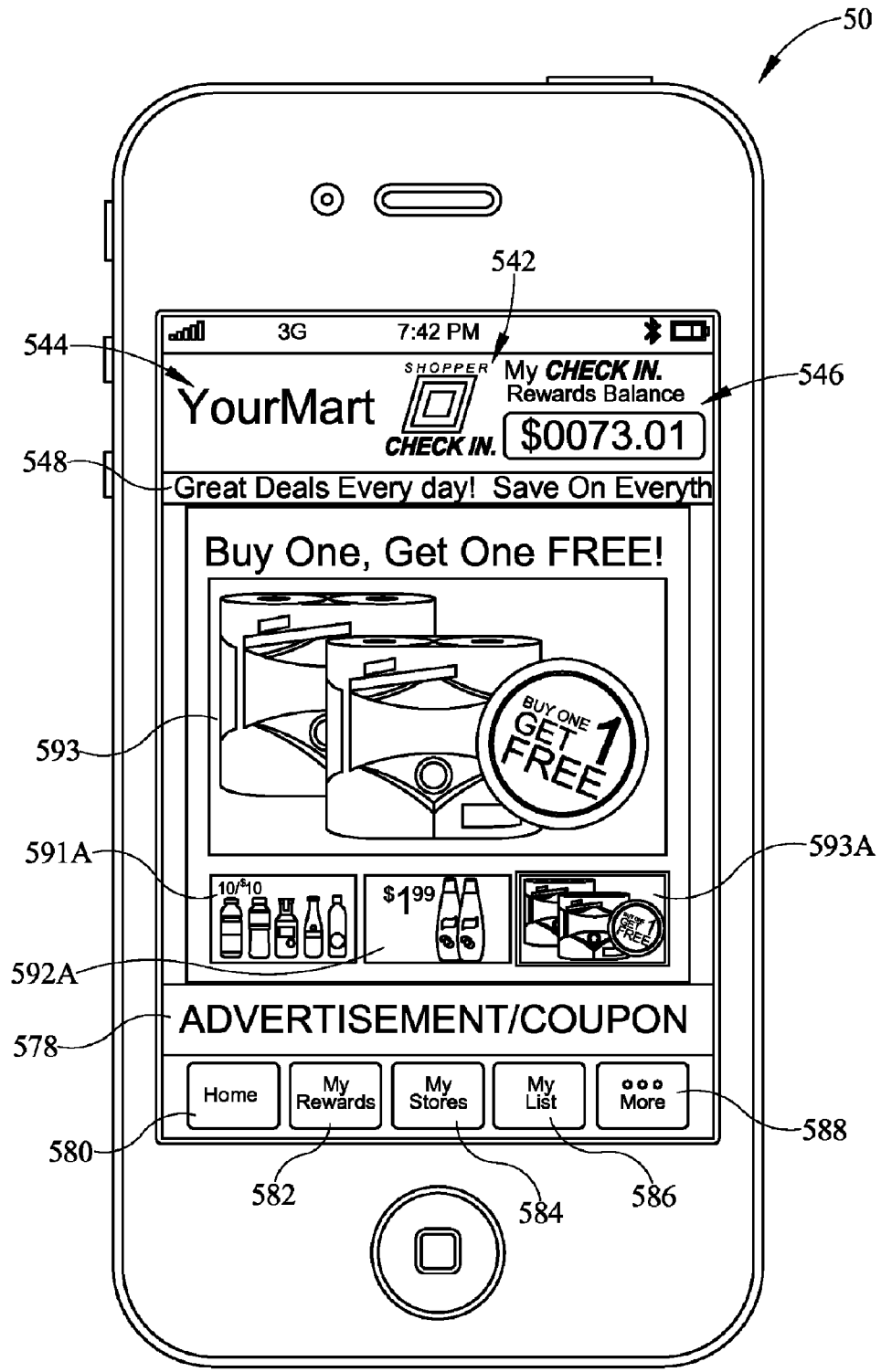
FIG. 13 illustrates a third targeted advertisement screen of the embodiment of the application for checking-in to a physical store.

Referring now to FIGS. 11-13, targeted advertisement screens of the application for checking-in to a physical store are illustrated. The screens may optionally be displayed to a shopper after the reward notification screen of FIG. 4 and prior to the store home screen of FIG. 5. FIG. 11 illustrates a screen showing a first targeted advertisement 591, FIG. 12 illustrates a screen showing a second targeted advertisement 592, and FIG. 3 illustrates a screen showing a third targeted advertisement 593. Smaller versions of each of the three targeted advertisements 591A, 592A, and 593A are also provided on each of the screens. Each of the screens of FIGS. 11-13 may be displayed for a given amount of time before transitioning to the next screen. A shopper may actuate the smaller versions of the targeted advertisements 591A, 592A, and 593A to manually transition between the screens.

The targeted advertisements in FIGS. 11-13 may be pertinent to the physical store that the shopper has checked-in to and/or to the shopper. For example, the targeted advertisements 591-593 may be based upon past shopping experiences of the shopper as ascertained from the application, a shopper rewards program of the store, a shopper rewards program of another store, and/or from one or more marketing companies. A shopper may optionally receive further pecuniary rewards for viewing the targeted advertisements 591-593.

Figure 14:
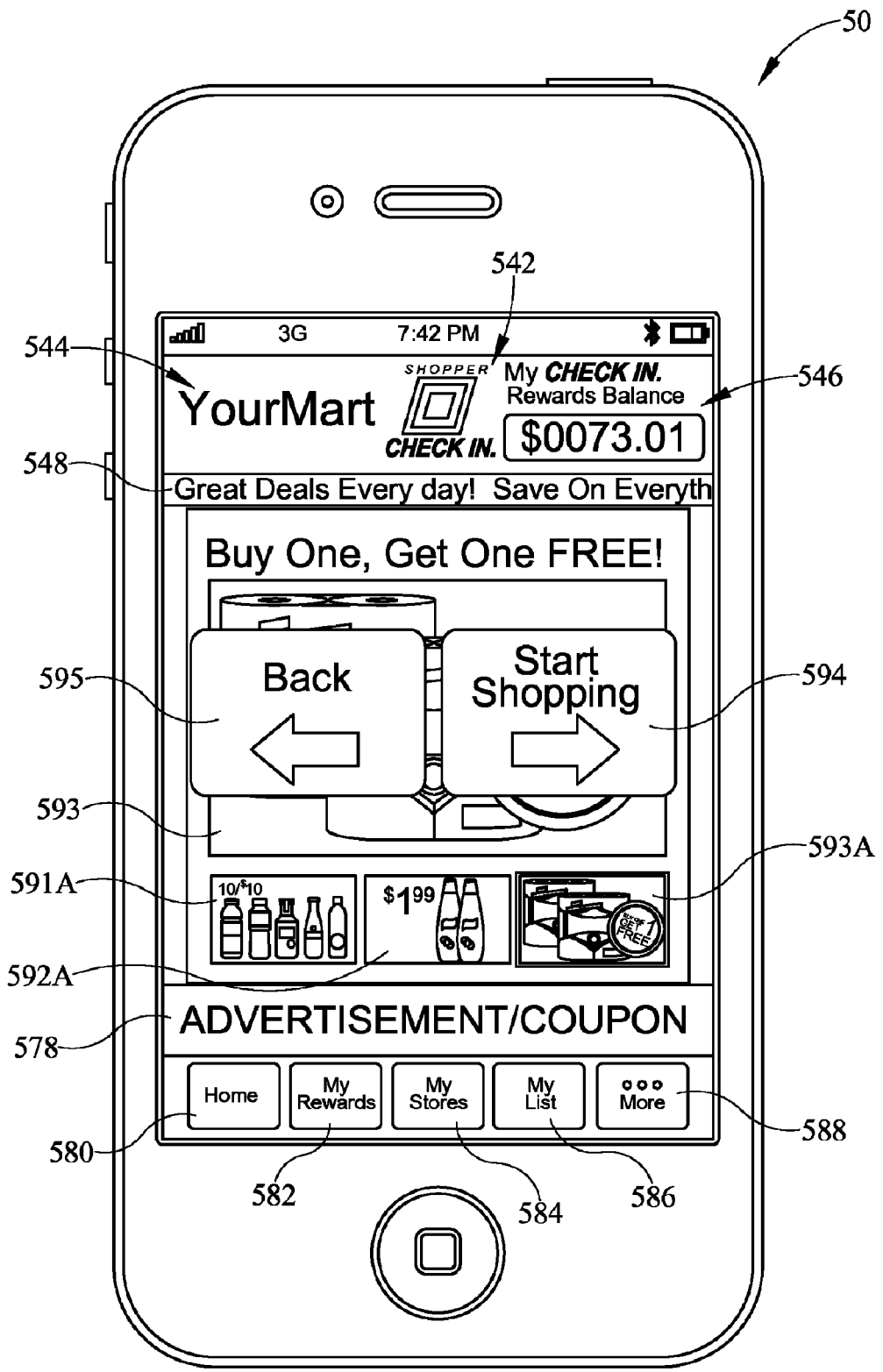
FIG. 14 illustrates a transitional screen of the embodiment of the application for checking-in to a physical store.

FIG. 14 illustrates a transitional screen of the embodiment of the application for checking-in to a physical store that may be displayed after the third targeted advertisement 593 is displayed for a period of time. The transitional screen enables the user to actuate the start shopping button 594 or the back button 595. The start shopping button 594 may direct the shopper to a store home screen such as the store home screen of FIG. 5. The back button 595 may direct the shopper back to the targeted advertisement screens of FIGS. 11-13.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of providing retail information on a shopping cart with combinational electronic retail specific information for a shopper, comprising:
   providing an informational display adapted for attaching said informational display to a shopping cart of a physical store;
   providing at least one retail informational sheet adapted for removably securing said at least one retail informational sheet in said informational display, said at least one retail informational sheet including a check-in code having store identification data;
   scanning said check-in code utilizing a mobile electronic device belonging to a shopper when at said physical store;
   electronically identifying said physical store based on said store identification data contained within said check-in code;
   identifying said shopper based on shopper identification data transmitted by said mobile electronic device;
   providing a link to a pecuniary check-in rewards account of said shopper on said mobile electronic device;
   providing a substantially instantaneous pecuniary check-in reward to said pecuniary check-in rewards account of said shopper upon utilizing said mobile electronic device to read said check-in code; and
   substantially instantaneously notifying said shopper of said pecuniary check-in reward via said mobile electronic device.

2. The method of claim 1, wherein said informational display is removably attached to a handle of said shopping cart.

3. The method of claim 1, further comprising directing said mobile electronic device to display at least one physical store screen after scanning said check-in code utilizing said mobile electronic device, said physical store screen containing at least some store specific information pertinent only to said physical store.

4. The method of claim 3, wherein said store specific information includes at least one special specific only to said physical store.

5. The method of claim 1, further comprising directing said mobile electronic device to display at least one physical store screen after scanning said check-in code utilizing said mobile electronic device, said physical store screen containing at least some store information pertinent to at least said physical store.

6. The method of claim 5, wherein said store information includes coupons specific at least to said physical store.

7. The method of claim 1, further comprising providing a substantially instantaneous further pecuniary reward to said shopper after scanning said check-in code utilizing said mobile electronic device and after at least one further recordable action within said physical store.

8. The method of claim 7, wherein said at least one further recordable action within said physical store includes viewing additional information related to an in-store product on said mobile electronic device.

9. The method of claim 7, wherein said further pecuniary reward includes a cash kickback for utilization of a coupon obtained through said mobile electronic device.

10. A method of electronically checking-in to a retail store and earning a reward for checking-in to said retail store, comprising:
    providing at least one removable display adapted for securing said at least one removable display to a shopping cart of said retail store, said at least one removable display including a check-in code having store identification data;
    scanning the check-in code utilizing a mobile electronic device belonging to a shopper to read said check-in code affixed to said shopping cart when at a location proximal to an entrance of said retail store;
    identifying said retail store based on said store identification data contained within said check-in code;
    identifying said shopper based on shopper identification data transmitted by said mobile electronic device;
    providing a substantially instantaneous pecuniary check-in reward to said shopper upon utilizing said mobile electronic device to read said check-in code;
    notifying said shopper of said pecuniary check-in reward via said mobile electronic device; and
    providing a substantially instantaneous further pecuniary reward to said shopper after utilizing said mobile electronic device to read said check-in code and after at least one further recordable action within said retail store and prior to engaging in a check-out process within said store.

11. The method of claim 10, further comprising directing said mobile electronic device to display at least one physical store screen after scanning said check-in code utilizing said mobile electronic device, said physical store screen containing at least some store specific information pertinent only to said physical store.

12. The method of claim 10, further comprising directing said mobile electronic device to display at least one physical store screen after scanning said check-in code utilizing said mobile electronic device, said physical store screen containing at least some store information pertinent to at least said physical store.

13. The method of claim 10, further comprising providing a substantially instantaneous shopper's account check-in reward to a shopper rewards account of said shopper upon scanning said check-in code utilizing said mobile electronic device.

14. The method of claim 10, wherein said further pecuniary reward includes a cash kickback for viewing of additional information related to an item barcode scanned by said mobile electronic device.

15. The method of claim 10, further comprising enabling said shopper to share said pecuniary check-in reward with third parties via said mobile electronic device.

16. The method of claim 15, further comprising enabling said shopper to share a selected percentage of said pecuniary reward with each of a plurality of third parties via said mobile electronic device.

17. The method of claim 10, further comprising utilizing geolocation to verify said store identification data.

18. The method of claim 10, further comprising utilizing geolocation to further refine said store identification data.

19. A method of providing replaceable retail specific information on a shopping cart including electronic information, comprising:
    affixing an informational display on a visible location of a shopping cart;
    incorporating a housing on said informational shopping cart display;
    removably retaining a magazine insert in said housing on said informational shopping cart display, said magazine including retail specific printed information for a particular retail location;

incorporating on said retail specific printed information at least one scanning code in a visible location on said informational display;

scanning said at least one scanning code on said magazine insert which is removably retained on said housing of said informational shopping cart display utilizing a mobile electronic device particularized to a specific shopper;

electronically identifying said particularized shopper and said particular retail location based upon said scanned at least one scanning code on said magazine insert;

linking to a shopper check-in rewards account for said particularized shopper by said mobile electronic device;

providing to said mobile electronic device retail specific electronic information for said particular retail location;

crediting said check-in rewards account for said particularized shopper based upon said particular retail location;

notifying said particularized shopper of said credited check-in rewards account substantially instantaneously.

20. The method of claim 19, further comprising providing a substantially instantaneous shopper's account check-in reward to a shopper rewards account of said shopper upon utilizing said mobile electronic device to scan said scanning code.

21. The method of claim 20, further comprising providing a substantially instantaneous further pecuniary reward to said shopper after utilizing said mobile electronic device to scan said scanning code and after at least one further recordable action within said retail store and prior to engaging in a check-out process within said store.

* * * * *